(12) United States Patent
Xu et al.

(10) Patent No.: US 9,749,144 B2
(45) Date of Patent: Aug. 29, 2017

(54) MBSFN AND RS CONSIDERATIONS IN BUNDLED TRANSMISSION DESIGN

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 14/604,043

(22) Filed: Jan. 23, 2015

(65) Prior Publication Data

US 2015/0215085 A1 Jul. 30, 2015

Related U.S. Application Data

(60) Provisional application No. 61/933,807, filed on Jan. 30, 2014.

(51) Int. Cl.
*H04W 72/04* (2009.01)
*H04L 12/18* (2006.01)
(Continued)

(52) U.S. Cl.
CPC .......... *H04L 12/189* (2013.01); *H04L 5/0048* (2013.01); *H04L 5/0053* (2013.01);
(Continued)

(58) Field of Classification Search
CPC ..... H04W 24/00; H04W 80/04; H04W 72/04; H04W 84/12
See application file for complete search history.

(56) References Cited

U.S. PATENT DOCUMENTS

2011/0110315 A1\* 5/2011 Chen .................. H04L 1/00
370/329
2011/0111781 A1\* 5/2011 Chen .................. H04B 7/02
455/507
(Continued)

FOREIGN PATENT DOCUMENTS

WO WO-2011044290 A1 4/2011

OTHER PUBLICATIONS

Ericsson, "Data Transmission for Enhanced Coverage MTC UE", 3GPP TSG-RAN WG1 Meeting #75, San Francisco, CA, USA, Nov. 11-15, 2013, R1-135648, pp. 1-2, URL: http://www.3gpp.org/ftp/Meetings_3GPP_SYNC/RAN/RAN1/Docs/, 3rd Generation Partnership Project.
(Continued)

*Primary Examiner* — Andrew Lee
(74) *Attorney, Agent, or Firm* — Holland & Hart LLP

(57) ABSTRACT

Methods, systems, and devices are described for bundling data transmissions in a wireless communication network. Bundled data transmissions may depend on subframe types and may account for multicast service single frequency network (MBMS) subframes. Bundled data transmissions may be repeated and a density of reference signals in the bundled data may be increased. The density of reference signals may be increased according to various techniques, including inserting additional pilot tones in the subframe, inserting additional pilot tones only in the bundled data, or adding additional pilot tones in one or more types of subframes. Multiple subframes used to transmit the bundled data may include, for example, a MBSFN subframe and a non-MBSFN subframe, and increasing density of reference signals may be performed differently for MBSFN subframes and non-MBSFN subframes. In some examples, bundled data transmissions are restricted to subframes of one type.

30 Claims, 19 Drawing Sheets

(51) Int. Cl.
*H04W 4/06* (2009.01)
*H04L 25/02* (2006.01)
*H04L 5/00* (2006.01)
*H04W 72/00* (2009.01)
*H04L 5/14* (2006.01)

(52) U.S. Cl.
CPC ........... *H04L 25/0226* (2013.01); *H04W 4/06* (2013.01); *H04L 5/0007* (2013.01); *H04L 5/1469* (2013.01); *H04W 72/005* (2013.01)

(56) References Cited

U.S. PATENT DOCUMENTS

| | | | | |
|---|---|---|---|---|
| 2011/0235555 | A1* | 9/2011 | Zhang | H04L 5/0007 370/280 |
| 2012/0320846 | A1* | 12/2012 | Papasakellariou | H04W 72/042 370/329 |
| 2013/0163444 | A1* | 6/2013 | Tee | H04L 69/40 370/252 |
| 2013/0329689 | A1* | 12/2013 | Choi | H04L 1/1829 370/329 |
| 2014/0126434 | A1* | 5/2014 | Li | H04L 5/14 370/280 |
| 2014/0153475 | A1* | 6/2014 | Huang | H04W 4/06 370/312 |
| 2014/0269357 | A1* | 9/2014 | Dhakal | H04L 5/0048 370/252 |
| 2014/0269519 | A1* | 9/2014 | Shan | H04L 5/0051 370/329 |
| 2014/0286255 | A1* | 9/2014 | Nam | H04L 1/1861 370/329 |
| 2014/0302887 | A1* | 10/2014 | Bashar | H04W 76/00 455/550.1 |
| 2015/0131494 | A1* | 5/2015 | He | H04B 7/0469 370/280 |
| 2015/0373694 | A1* | 12/2015 | You | H04W 24/10 370/329 |
| 2016/0164643 | A1* | 6/2016 | Loehr | H04L 1/1854 370/336 |
| 2016/0174014 | A1* | 6/2016 | You | H04W 4/005 370/312 |
| 2016/0211959 | A1* | 7/2016 | Jongren | H04L 5/0051 |

OTHER PUBLICATIONS

Huawei et al., "Remaining Details on CSI RS", 3GPP TSG RAN WG1 meeting #63, Jacksonville, USA, Nov. 15-19, 2010, R1-105840, pp. 1-12, 3rd Generation Partnership Project.

ISA/EPO, International Search Report and Written Opinion of the International Searching Authority, Int'l. App. No. PCT/US2015/012906, Mar. 30, 2015, European Patent Office, Rijswijk, NL, 12 pgs.

Qualcomm EP, "DL RS Design and Peak Spectral Efficiency Considerations", 3GPP TSG-RAN WG1 #58, Shenzhen, China, Aug. 24-28, 2009, R1-093106, pp. 1-5, 3rd Generation Partnership Project.

* cited by examiner

MBSFN AND RS CONSIDERATIONS IN BUNDLED TRANSMISSION DESIGN

CROSS REFERENCES

The present application for patent claims priority to U.S. Provisional Patent Application No. 61/933,807 by Xu et al., entitled "MBSFN And RS Considerations In Bundled Transmission Design," filed Jan. 30, 2014, assigned to the assignee hereof, and expressly incorporated by reference herein.

BACKGROUND

Field of the Disclosure

The present disclosure relates to wireless communication systems, and more particularly to bundled transmissions in wireless communication.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Bundled transmission techniques may be used to improve coverage in wireless systems, and these techniques may become more relevant as reception-limited devices (e.g., MTC and other low cost devices) begin to proliferate. These bundling techniques may present implementation challenges in channel estimation for systems in which MTC devices have relatively poor channel quality.

SUMMARY

The described features generally relate to one or more improved systems, methods, and devices for wireless communication utilizing bundling techniques that may provide repeated transmissions of bundled data. Data may be identified for transmission, and it may be determined that the data is to be transmitted in a bundled transmission using two or more subframes. Within the two or more subframes, in order to provide enhanced channel estimation for a channel used to transmit the bundled data, a density of reference signals may be increased. The density of reference signals may be increased according to one or more techniques, including inserting additional pilot tones in the subframe, inserting additional pilot tones only in the bundled data, or adding additional pilot tones in one or more types of subframes. The two or more subframes used to transmit the bundled data may include, for example, a multimedia broadcast multicast service single frequency network (MBSFN) subframe and a non-MBSFN subframe, and increasing density of reference signals may be performed differently for MBSFN subframes and non-MBSFN subframes. In some examples, one or more additional demodulation reference signal (DMRS) or common reference signal (CRS) tones may be added to MBSFN subframes.

A method of wireless communication at a wireless device is described. The method may include identifying data for transmission on a wireless communications network, determining that the data is to be transmitted in a bundled transmission using two or more subframes, and increasing a density of reference signals in at least one of the two or more subframes.

An apparatus for wireless communication at a wireless device is described. The apparatus may include means for identifying data for transmission on a wireless communications network, means for determining that the data is to be transmitted in a bundled transmission using two or more subframes, and means for increasing a density of reference signals in at least one of the two or more subframes.

A further apparatus for wireless communication at a wireless device is described. The apparatus may include a processor, memory in electronic communication with the processor, and instructions stored in the memory. The instructions may be executable by the processor to identify data for transmission on a wireless communications network, determine that the data is to be transmitted in a bundled transmission using two or more subframes, and increase a density of reference signals in at least one of the two or more subframes.

A non-transitory computer-readable medium storing code for wireless communication at a wireless device is described. The code may include instructions executable to identify data for transmission on a wireless communications network, determine that the data is to be transmitted in a bundled transmission using two or more subframes, and increase a density of reference signals in at least one of the two or more subframes.

In some examples of the method, apparatuses, or non-transitory computer-readable medium described above, increasing the density of reference signals comprises inserting one or more additional pilot tones in the at least one subframe. Additionally or alternatively, in some examples the one or more additional pilot tones are rate matched around existing legacy signals.

In some examples of the method, apparatuses, or non-transitory computer-readable medium described above, the one or more additional pilot tones are inserted within one or more resource blocks used to transmit the bundled transmission. Additionally or alternatively, in some examples, the two or more subframes comprise at least one multimedia broadcast multicast service single frequency network (MBSFN) subframe and at least one non-MBSFN subframe.

In some examples of the method, apparatuses, or non-transitory computer-readable medium described above, increasing the density of reference signals includes transmitting a plurality of demodulation reference signal (DMRS) or common reference signal (CRS) tones during the MBSFN subframe. Additionally or alternatively, some examples may include increasing the density of reference signals comprises inserting DMRS tones utilizing all available DMRS resources within a resource block used for DMRS transmissions.

In some examples of the method, apparatuses, or non-transitory computer-readable medium described above, increasing the density of reference signals includes inserting DMRS tones utilizing a subset of available DMRS resources within a resource block used for DMRS transmissions, and the DMRS tones may be transmitted at an increased power relative to a specified power for DMRS tones. Additionally or alternatively, in some examples, increasing the density of reference signals includes inserting additional DMRS tones within a resource block used for DMRS transmissions.

In some examples of the method, apparatuses, or non-transitory computer-readable medium described above, increasing the density of reference signals includes inserting a plurality of demodulation reference signal (DMRS) or common reference signal (CRS) tones, and the number of DMRS or CRS tones transmitted during a second subframe of the two or more subframes may be greater than a number of DMRS or CRS tones transmitted during a first subframe of the two or more subframes. Additionally or alternatively, in some examples, a physical downlink shared channel (PDSCH) or a physical broadcast channel (PBCH) is used for the transmission.

In some examples of the method, apparatuses, or non-transitory computer-readable medium described above, the PBCH is used for the transmission, and the PBCH transmissions may be transmitted using predetermined subframes. Additionally or alternatively, in some examples, the PBCH transmissions have different predetermined patterns determined based on the wireless communications system operating according to a time division duplex (TDD) protocol or a frequency division duplex (FDD) protocol.

In some examples of the method, apparatuses, or non-transitory computer-readable medium described above, the predetermined subframes have a common predetermined pattern irrespective of whether the wireless communications system is operating according to a time division duplex (TDD) protocol or a frequency division duplex (FDD) protocol. Additionally or alternatively, in some examples, the PBCH transmissions are transmitted using at least one broadcast subframe and at least one non-broadcast subframe.

In some examples of the method, apparatuses, or non-transitory computer-readable medium described above, a pattern of bundled PBCH transmissions using the at least one broadcast subframe is different than a pattern of bundled PBCH transmissions using the at least one non-broadcast subframe.

A further method of wireless communication at a wireless device is described. The method may include determining that data is to be transmitted in a bundled transmission using two or more subframes, determining whether a multimedia broadcast multicast service (MBMS) transmission is scheduled for one of the subframes, and modifying the bundled transmission based at least in part on determining that the MBMS transmission is scheduled.

A further apparatus for wireless communication at a wireless device is described. The apparatus may include means for determining that data is to be transmitted in a bundled transmission using two or more subframes, means for determining whether a multimedia broadcast multicast service (MBMS) transmission is scheduled for one of the subframes, and means for modifying the bundled transmission based at least in part on determining that the MBMS transmission is scheduled.

A further apparatus for wireless communication at a wireless device is described. The apparatus may include a processor, memory in electronic communication with the processor, and instructions stored in the memory. The instructions may be executable by the processor to determine that data is to be transmitted in a bundled transmission using two or more subframes, determine whether a multimedia broadcast multicast service (MBMS) transmission is scheduled for one of the subframes, and modify the bundled transmission based at least in part on determining that the MBMS transmission is scheduled.

A further non-transitory computer-readable medium storing code for wireless communication at a wireless device is described. The code may include instructions executable to determine that data is to be transmitted in a bundled transmission using two or more subframes, determine whether a multimedia broadcast multicast service (MBMS) transmission is scheduled for one of the subframes, and modify the bundled transmission based at least in part on determining that the MBMS transmission is scheduled.

In some examples of the method, apparatuses, or non-transitory computer-readable medium described above, modifying the bundled transmission comprises refraining from transmitting the data on the subframe scheduled for the MBMS transmission. Additionally or alternatively, in some examples modifying the bundled transmission comprises increasing a density of reference signals in the subframe scheduled for the MBMS transmission.

Some examples of the method, apparatuses, or non-transitory computer-readable medium described above may further include transmitting first signaling indicative of MBMS scheduling to a first set of user equipment (UEs) scheduled to receive the bundled transmission, and transmitting second signaling indicative of MBMS scheduling to a second set of UEs scheduled to receive the MBMS transmission. Additionally or alternatively, in some examples, the bundled transmission comprises a bundled unicast transmission.

In some examples of the method, apparatuses, or non-transitory computer-readable medium described above, the bundled transmission includes a bundled broadcast transmission.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
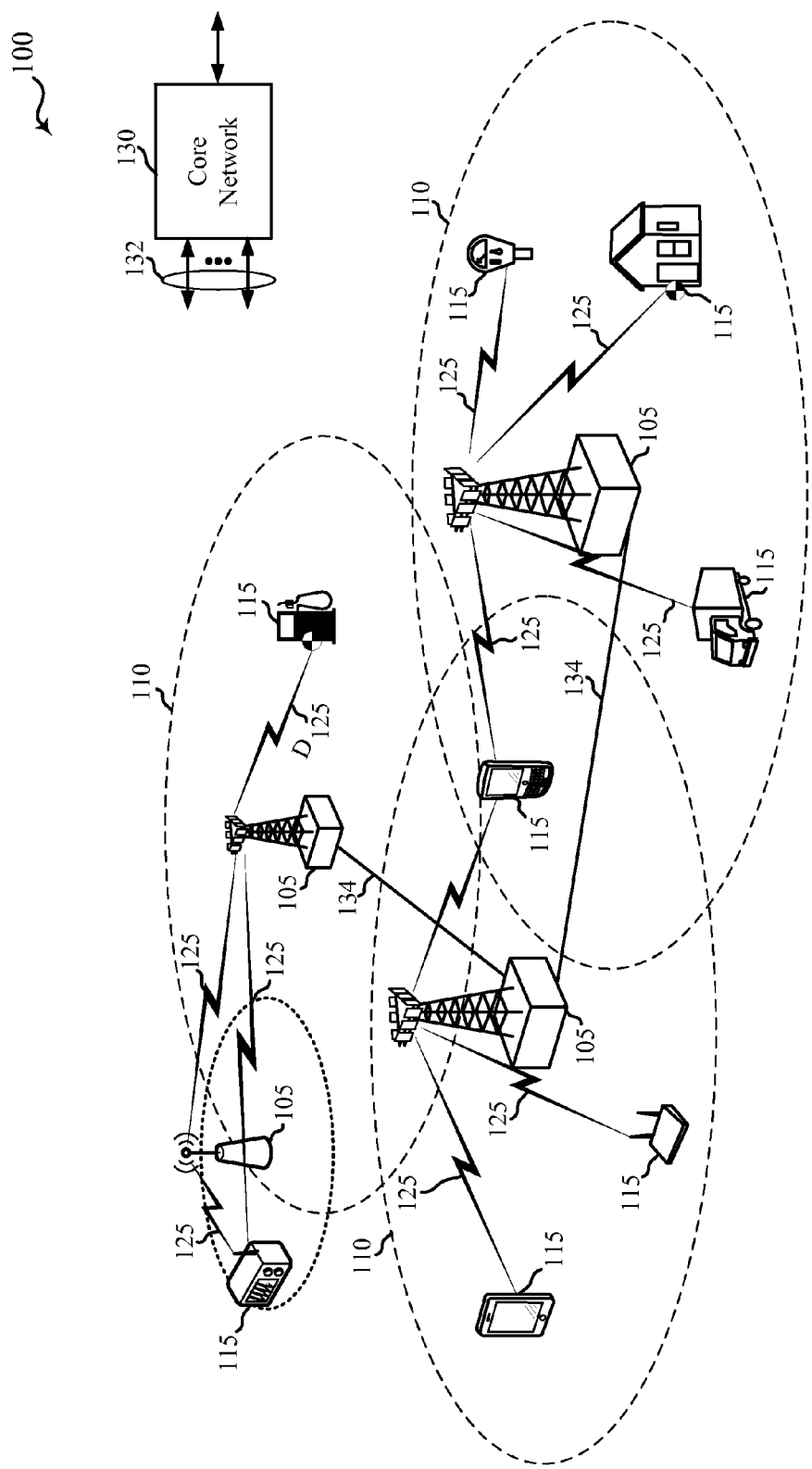
FIG. 1 is a block diagram illustrating an example of a wireless communications system configured for effective deployment of coverage enhancement techniques, in accordance with various embodiments.

Bundling techniques are described that may provide repeated transmissions of bundled data, thereby enhancing the reception of bundled data at coverage-limited devices. Within the two or more subframes, in order to provide enhanced channel estimation for a channel used to transmit the bundled data, a density of reference signals may be increased. The density of reference signals may be increased according to one or more techniques, including inserting additional pilot tones in the subframe, inserting additional pilot tones only in the bundled data, or adding additional pilot tones in one or more types of subframes. The two or more subframes used to transmit the bundled data may include, for example, a multimedia broadcast multicast service single frequency network (MBSFN) subframe and a non-MBSFN subframe, and increasing density of reference signals may be performed differently for MBSFN subframes and non-MBSFN subframes. In some examples, one or more additional demodulation reference signal (DMRS) or common reference signal (CRS) tones may be added to MBSFN subframes.

Bundling techniques may be applied in, for example, voice over internet protocol (VoIP) and medium rate deployments. Coverage enhancement techniques may also be employed for machine-type communication (MTC) applications. MTC and/or machine-to-machine (M2M) communication may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. In many cases, MTC devices are power constrained. MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Systems and devices, as described herein, may be configured bundled transmissions, in which a number of subframes (e.g., 4 subframes) are used to provide repeated transmissions of data. For example, data to be transmitted using a physical uplink shared channel (PUSCH) may be transmitted in 4 consecutive subframes. The same automated repeat request (ARQ) process number may be used in each of the bundled subframes, and a bundle may be treated as a single resource, i.e., a single grant and a single hybrid-ARQ acknowledgement may be used for each bundle. In many deployments, MTC type devices may be relatively coverage limited due to location of the device and/or relatively low cost components used in the devices, thus resulting in relatively poor channel conditions for some devices. For devices having poor channel conditions, channel estimation may be a bottle neck in data transmission, and even if data tones are repeated the performance may still be limited due to poor channel estimation. According to various examples described herein, channel estimation may be enhanced by providing higher pilot tone density, which may provide enhanced channel estimation and thereby provide more efficient transmission of data.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100 configured for effective deployment of coverage enhancement techniques, in accordance with various embodiments. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information or user data with the core network 130 through backhaul links 132. Backhaul links 132 may be wired backhaul links (e.g., copper, fiber, etc.) and/or wireless backhaul links (e.g., microwave, etc.). In some embodiments, the base stations 105 may communicate, either directly or indirectly, with each other over backhaul links 134, which may be wired or wireless communication links. The system 100 may support bundling in which data may be transmitted in repeated transmissions in multiple subframes, and in which a density of pilot tones in the bundled data may be increased to provide enhanced channel estimation. Bundling operations may enhance data reception capability for devices that may have relatively limited coverage in the system. For example, one or more communications link 125 may include repeated transmissions.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The communication devices 115 are dispersed throughout the wireless network 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A communication device 115 may be an MTC device, a cellular phone, a personal digital assistant (PDA), a wireless modem, a wireless communication device, a handheld device, a tablet computer, a laptop computer, a cordless phone, a wireless local loop (WLL) station, or the like. In some implementations, an MTC device may be included in or operate in conjunction with a meter (e.g., a gas meter) or other monitoring device. A communication device may be able to communicate with macro base stations, pico base stations, femto base stations, relay base stations, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Base stations 105 and mobile devices 115 may, according to examples, utilize bundling techniques to provide enhanced reception of transmitted data. As mentioned above, bundling techniques may provide repeated transmissions of bundled data, thereby enhancing the reception of bundled data at coverage-limited devices. Within the two or more subframes, in order to provide enhanced channel estimation for a channel used to transmit the bundled data, a density of reference signals may be increased. The density of reference signals may be increased according to one or more techniques, including inserting additional pilot tones in the subframe, inserting additional pilot tones only in the bundled data, or adding additional pilot tones in one or more types of subframes. The two or more subframes used to transmit the bundled data may include, for example, a multimedia broadcast multicast service single frequency network (MBSFN) subframe and a non-MBSFN subframe, and increasing density of reference signals may be performed differently for MBSFN subframes and non-MBSFN subframes. In some examples, one or more additional demodulation reference signal (DMRS) or common reference signal (CRS) tones may be added to MBSFN subframes. Or, in some examples, bundled data transmissions may be restricted to subframes having a particular reference signal density. For instance, all bundled data transmission may be on non-MBSFN subframes or on MBSFN subframes but, in some cases, not on both. These aspects, described below in more detail, may be integrated in whole or in part into a wide variety of network configurations.

In some embodiments, the system 100 is an LTE/LTE-A network, and a general description of aspects of such a network follows. In LTE/LTE-A networks, the terms evolved Node B (eNB) and user equipment (UE) may be generally used to describe the base stations 105 and communication devices 115, respectively. In the present disclosure, communication devices 115 and UEs 115 may be used interchangeably. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The communications system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS may interconnect with other access networks using other Radio Access Technologies. For example, EPS 100 may interconnect with a UTRAN-based network and/or a CDMA-based network via one or more Serving GPRS Support Nodes (SGSNs). To support mobility of UEs 115 and/or load balancing, EPS 100 may support handover of UEs 115 between a source eNB 105 and a target eNB 105. EPS 100 may support intra-RAT handover between eNBs 105 and/or base stations of the same RAT (e.g., other E-UTRAN networks), and inter-RAT handovers between eNBs and/or base stations of different RATs (e.g., E-UTRAN to CDMA, etc.). The EPS 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130. Logical nodes within EPC 130 may include one or more Mobility Management Entities (MMEs), one or more Serving Gateways, and one or more Packet Data Network (PDN) Gateways (not shown). Generally, the MME may provide bearer and connection management.

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115. The UEs 115 may be of various categories. For example, some of the UEs 115 may be reception-limited UEs 115, which may affect the multi-path capabilities of those UEs 115.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The downlink physical channels may include at least one of a physical downlink control channel (PDCCH) and/or enhanced PDCCH (EPDCCH), a physical HARQ indicator channel (PHICH), a physical downlink shared channel (PDSCH), and a physical broadcast channel (PBCH). The uplink physical channels may include at least one of a physical uplink control channel (PUCCH) and a physical uplink shared channel (PUSCH). The PDCCH may carry downlink control information (DCI), which may indicate data transmissions for UEs 115 on the PDSCH as well as provide UL resource grants to UEs 115 for the PUSCH. The UE may transmit control information in the PUCCH on the assigned resource blocks in the control section. The UE 115 may transmit only data or both data and control information in the PUSCH on the assigned resource blocks in the data section. According to various examples, bundling techniques may be employed for data transmissions on one or more uplink and/or downlink channels. For example, a reception-limited UE 115 (e.g., a low-cost MTC) may be configured to transmit bundled data using PUSCH and/or PUCCH, and may be configured to receive bundled data using PDCCH, PDSCH, and/or PBCH.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Time intervals may be expressed in multiples of a basic time unit $T_s=1/30720000$. Each frame structure may have a radio frame length $T_f=307200 \cdot T_s=10$ ms and may include two half-frames or slots of length $153600 \cdot T_s=5$ ms each. Each half-frame may include five subframes of length $30720 \cdot T_s=1$ ms.

In some examples, the wireless communications system 100 may support Multimedia Broadcast Multicast Services (MBMS), which is a point-to-multipoint interface specification designed to provide efficient delivery of broadcast and multicast services both within a cell as well as within a network such as wireless communications system 100. For broadcast transmission across multiple cells, MBMS results in a system having coordinated configuration for transmissions associated with a broadcast signal. Due to the broadcast nature of MBMS transmissions, reference signals specific to a particular mobile device 115, such as a demodulation reference signal (DMRS), may not be transmitted in subframes that are designated as MBMS subframes. Furthermore, other types of reference signals, such as a common reference signal (CRS), may only be transmitted during an initial part of a MBSFN subframe. In some cases, a bundled transmission may be modified based on determining that a MBMS transmission is scheduled.

In some situations, subframes that are identified as MBSFN subframes may be used to carry bundled data that is to be transmitted to a mobile device 115. However, in the case of a coverage-limited MTC device, the potentially reduced number of reference signals in MBSFN subframes may reduce channel estimation ability of the device. According to some examples, whenever there is bundled transmission, the bundled data may be all transmitted on either non-MBSFN subframes or MBSFN subframes, but not on different subframe types within the same bundle. According to other examples, bundled data may be transmitted partially on MBSFN subframes and partially on non-MBSFN subframes, with an increased density of reference signals used in the MBSFN subframes. In still further examples, bundled data may be all transmitted on either non-MBSFN subframes or MBSFN subframes, with CRS demodulation techniques used in non-MBSFN subframes and DMRS demodulation techniques used in MBSFN subframes. Various examples of bundling techniques will be described in more detail below.

Figure 2:
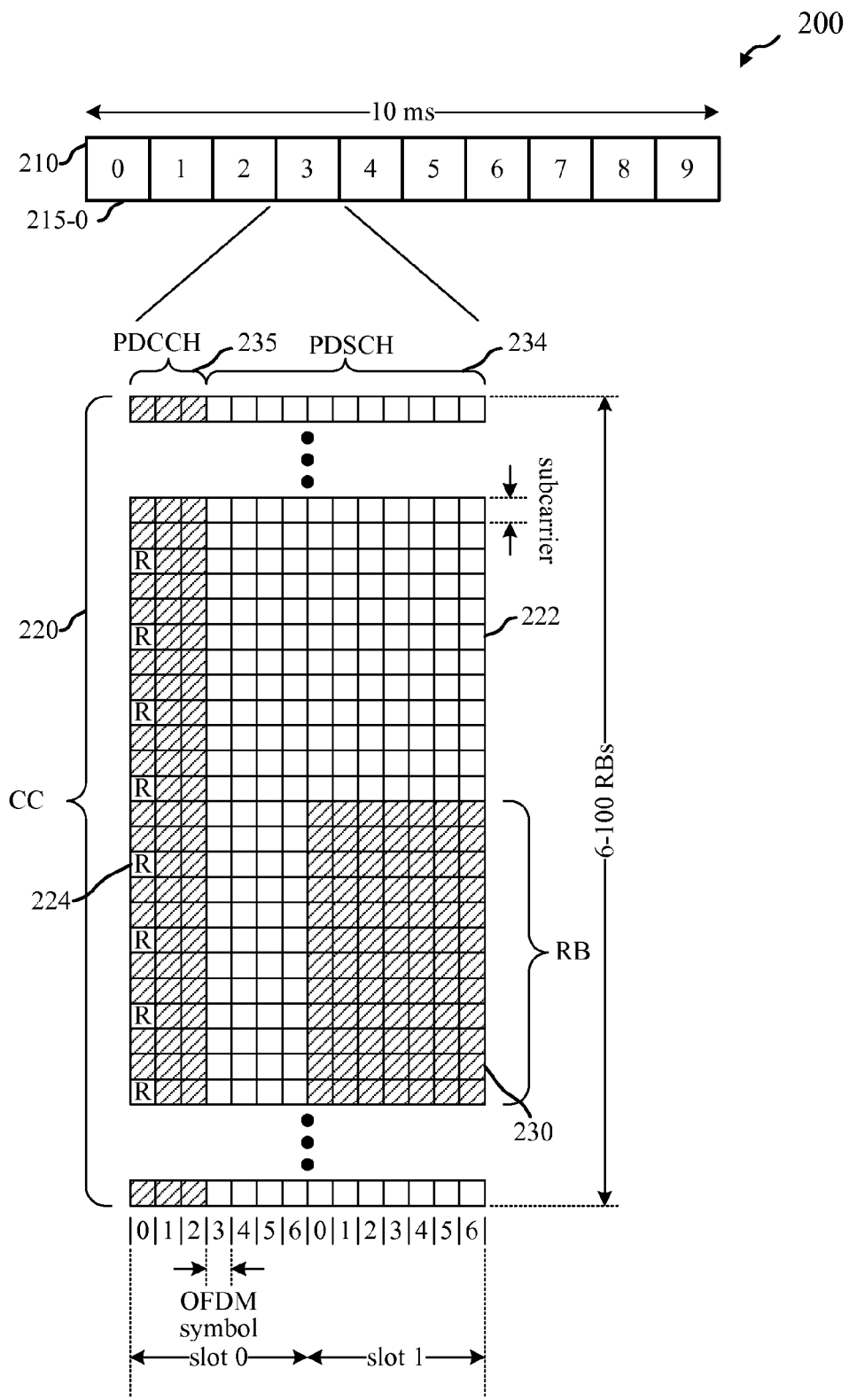
FIG. 2 is a block diagram illustrating an example of a downlink frame structure, which may be employed in accordance with various embodiments.

As mentioned above, various different physical channels may be transmitted, and various reference signals may be transmitted for use in channel estimation, within one or more subframes of a radio frame. FIG. 2 is a diagram illustrating an example of a downlink frame structure 200 that may be used in a wireless communication system, including the wireless communication system 100 described above with reference to FIG. 1. For example, the frame structure 200 may be used in LTE/LTE-A or similar systems. A frame 210 (10 ms) may be divided into 10 equally sized sub-frames (e.g., subframe 215-0, etc). Each sub-frame may include two consecutive time slots, slot 0 and slot 1. An OFDMA component carrier 220 may be illustrated as a resource grid representing two time slots. The resource grid may be divided into multiple resource elements 222.

In LTE/LTE-a, a resource block 230 may contain 12 consecutive subcarriers in the frequency domain and, for a normal cyclic prefix in each OFDM symbol, 7 consecutive OFDM symbols in the time domain, or 84 resource elements. Some of the resource elements, designated R (e.g., 224), may include downlink reference signals (DL-RS). The DL-RS may include Cell-specific or common RS (CRS) and UE-specific RS (UE-RS) such as a DMRS. Reference signals used to perform channel estimation may be determined based on a transmission mode (TM) of the DL transmissions (e.g., TM 9 utilizes DMRS for channel estimation). UE-RS may be transmitted only on the resource blocks upon which the corresponding physical DL shared channel (PDSCH) 234 is mapped. The number of bits carried by each resource element may depend on the modulation scheme. Thus, the more resource blocks that a UE receives and the higher the modulation scheme, the higher the data rate may be for the UE.

As illustrated in FIG. 2, PDCCH 235 may be time-division multiplexed with PDSCH 234 and fully distributed within the entire bandwidth of the component carrier 220 within a first region of each subframe 215. In the example illustrated in FIG. 2, PDCCH 235 takes up the first three symbols of the subframe 215. PDCCH 235 may have more or fewer symbols as is appropriate based on the component carrier bandwidth and amount of control information for the subframe 215. The PHICH and/or PCFICH channels may be found in the first symbol of PDCCH 235 (not shown).

As mentioned above, in some deployments certain subframes may be designated as MBSFN subframes, and other subframes may be non-MBSFN subframes. The configuration of such subframes may be provided in PBCH data that may be transmitted from an eNB. According to some examples, certain subframes may not be configured as MBSFN subframes. For example, for FDD operation, subframes 0, 4, 5, and 9 may be non-MBSFN-configurable, and for TDD operation subframes 0, 1, 5, and 6 may be non-MBSFN-configurable. As mentioned above, various examples may support bundling of data using MBSFN subframes and/or non-MBSFN subframes.

In some examples, bundled data may be transmitted in non-MBSFN subframes but not in MBSFN subframes, or vice-versa. For instance, a base station may transmit all bundled PDSCH in non-MBSFN subframes, and it may refrain from transmitting bundled data in MBSFN subframes; or it may transmit all bundled PDSCH in MBSFN subframes, and it may refrain from transmitting bundled PDSCH in non-MBSFM subframes. As discussed below, MBSFN and non-MBSFN subframes may have different densities of references signals. A base station may thus determine that data is to be transmitted in a bundled transmission using two or more subframes having a first reference signal density, and it may refrain from transmitting the data on a subframe having a second reference signal density. This may involve rate matching subframes having the first reference signal density (e.g., non-MBSFN subframes) around subframes having the second reference signal density (e.g., MBSFN subframes). Or, it may involve inserting subframes having the second reference signal density between subframes having the first reference signal density—e.g., puncturing a PDSCH bundled transmission with an MBSFN subframe.

In some examples, bundled data may include MBMS subframes. MBMS transmissions may be based on frame structures with extended cyclic prefix (CP), which can be different from other subframes. Processing bundled transmission across MBMS and non-MBMS subframes may thus require a UE to support both frame structures with extended CP and normal CP. This may result in additional circuit or computational complexity and may not be desirable for MTC devices intended to be low complexity and low cost. The bundled transmission may therefore be modified based on the presence of a MBMS subframe in order to limit processing complexity, for example. A base station may thus determine that data is to be transmitted in a bundled transmission using two or more subframes, determine whether a MBMS transmission is scheduled for one of the subframes, and modify the bundled transmission based at least in part on determining that the MBMS transmission is scheduled. This may involve refraining from transmitting the data on the subframe scheduled for the MBMS transmission. Or, it may involve increasing a density of reference signals in the subframe scheduled for the MBMS transmission. Additionally, first signaling indicative of MBMS scheduling may be transmitted to a first set of UEs scheduled to receive the bundled transmission, and second signaling indicative of MBMS scheduling may be transmitted to a second set of UEs scheduled to receive the MBMS transmission. The first signaling and the second signaling may be different from one another. In some cases, the bundled transmission includes a bundled unicast transmission or a bundled broadcast transmission.

Figure 3:
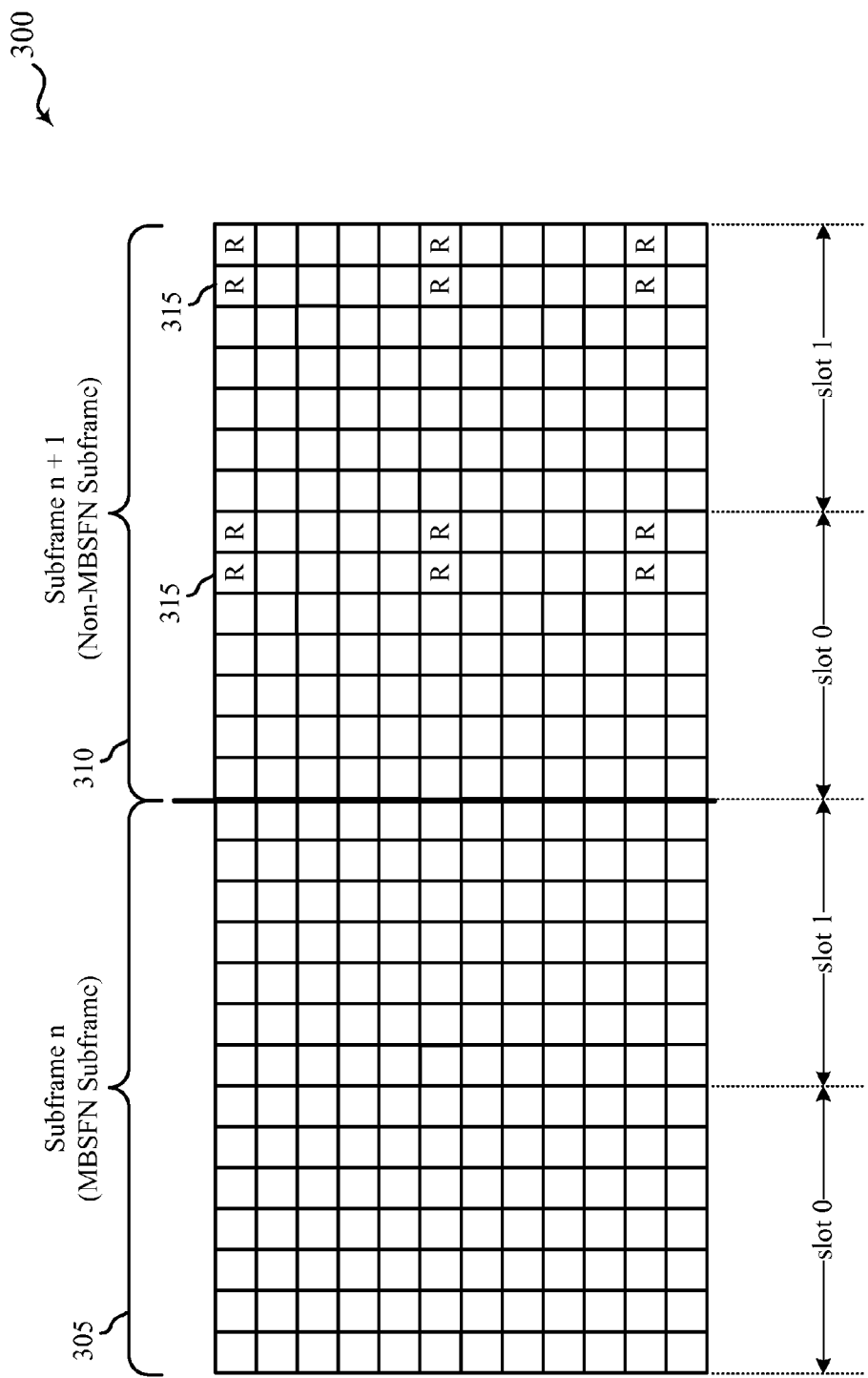
FIG. 3 is a block diagram illustrating an example of DMRS resources that may be employed in accordance with various embodiments.

FIG. 3 is a diagram illustrating an example frame structure 300 of DMRS tones in MBSFN and non-MBSFN subframes that may be used in a wireless communication system, including the wireless communication system 100 described above with reference to FIG. 1. For example, the frame structure 300 may be used in LTE/LTE-A or similar systems. As mentioned above, MBSFN configured subframes, according to certain examples, may not include UE specific reference signals, such as DMRS tones, while non-MBSFN subframes may include such UE specific reference signals. In FIG. 3, subframe n 305 may be an MBSFN subframe, and subframe n+1 310 may be a non-MBSFN subframe. Subframe n+1 305 thus may include DMRS tones 315, also referred to generally as pilot tones, at predetermined locations, while subframe n does not include such DMRS tones. In examples where bundling is used to transmit data using both MBSFN subframe n 305 and non-MBSFN subframe n+1 310, the density of DMRS tones 315 is reduced in the MBSFN subframe n 305, which may have a negative impact on channel estimation. Thus, even though data may be repeated using bundling techniques, the benefits of bundling may be reduced due to poor channel estimation.

As depicted, the density of reference signals may vary between MBSFN subframe 305 and a non-MBSFN subframe 310. In some examples, bundled data may be transmitted on subframes have one reference signal density (e.g., MBSFN subframe 305) and bundled data may not be transmitted on subframes having a different reference signal density (e.g., non-MBSFN subframe 310).

Figure 4:
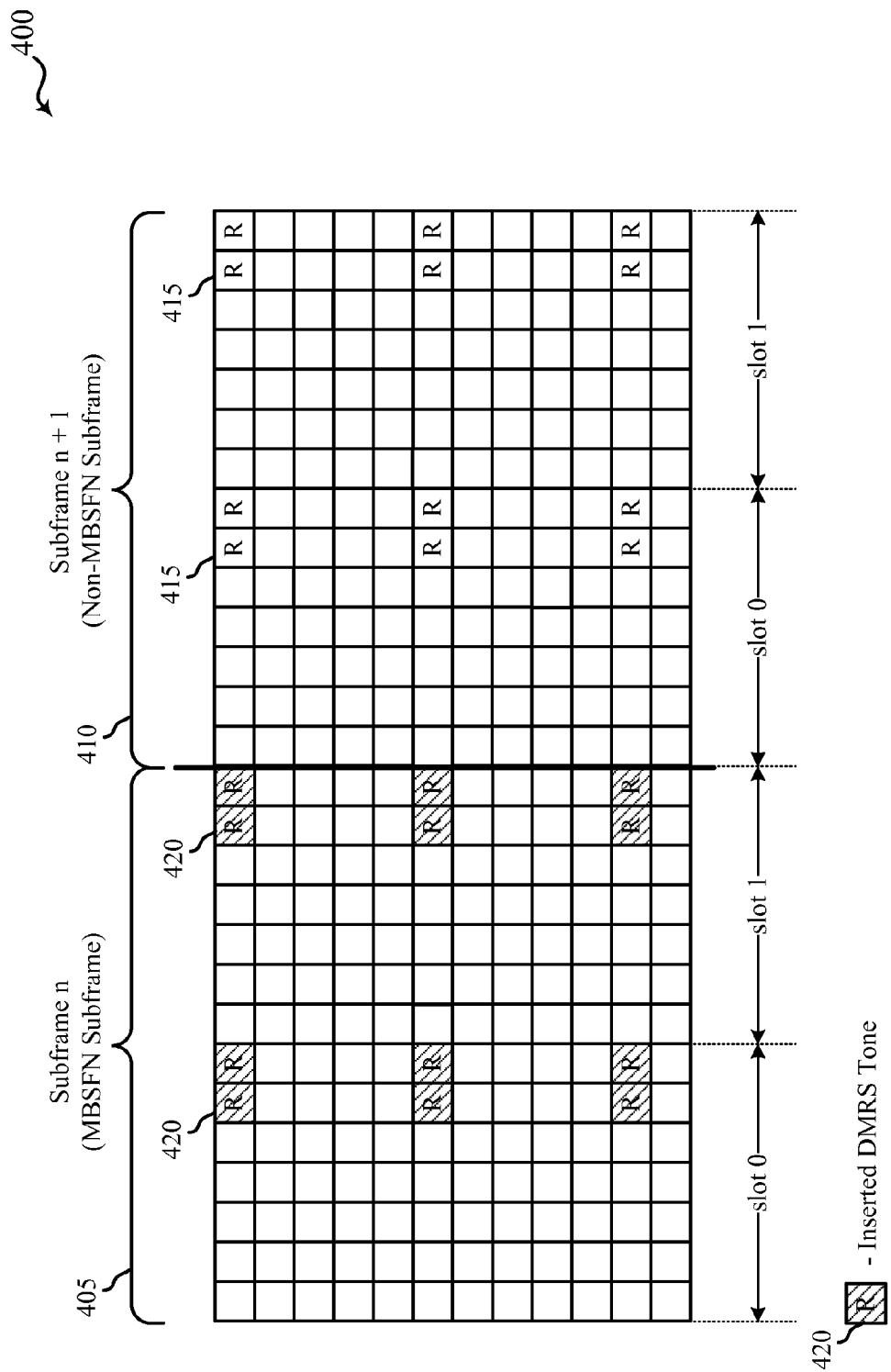
FIG. 4 is a block diagram illustrating an example of increased density of DMRS resources that may be employed in accordance with various embodiments.

FIG. 4 is a diagram illustrating an example frame structure 400 with increased DMRS tone density in MBSFN and non-MBSFN subframes that may be used in a wireless communication system, including the wireless communication system 100 described above with reference to FIG. 1. For example, the frame structure 400 may be used in LTE/LTE-A or similar systems. In the example, of FIG. 4, bundled transmissions may be transmitted partially on MBSFN subframe n 405 and partially on non-MBSFN subframe n+1 410, and a device (such as an MTC type device 115 of FIG. 1) may follow DMRS demodulation (e.g., TM 9) for both types of subframes. The DMRS demodulation may utilize inserted DMRS tones 420 that are inserted in the MBSFN subframe 405, which may match the locations of DMRS tones 415 in non-MBSFN subframe 410.

For bundled transmissions in which channel estimation may be a bottleneck to data rate, such an increase in the density of DMRS tones for bundled PDSCH data may enhance bundled data transmissions. Thus, bundling techniques may enhance channel estimation through identifying data for transmission on a wireless communications network, determining that the data is to be transmitted in a bundled transmission using two or more subframes, and increasing a density of reference signals in at least one of the two or more subframes. In some examples, the additional DMRS tones 420 may be rate matched around existing legacy signals so as to not impact legacy users of the wireless communications system. In certain examples, the additional DMRS tones may be inserted within one or more resource blocks used to transmit the bundled transmission.

Figure 5:
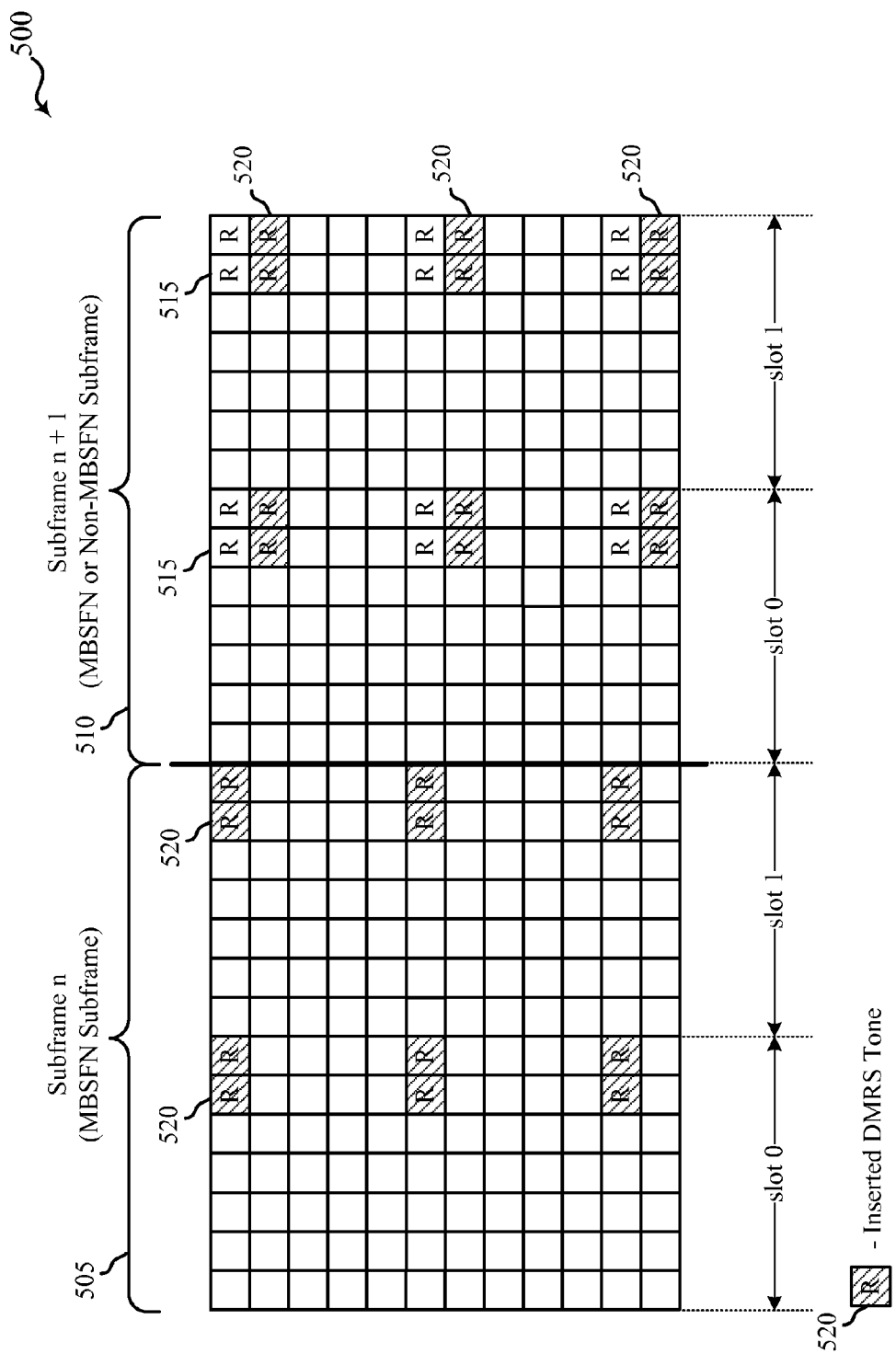
FIG. 5 is a block diagram illustrating another example of increased density of DMRS resources that may be employed in accordance with various embodiments.

FIG. 5 is a diagram illustrating an example frame structure 500 with increased DMRS tone density in MBSFN and/or non-MBSFN subframes that may be used in a wireless communication system, including the wireless communication system 100 described above with reference to FIG. 1. For example, the frame structure 500 may be used in LTE/LTE-A or similar systems. In the example, of FIG. 5, bundled transmissions may be transmitted partially on MBSFN subframe n 505 and partially on MBSFN or non-MBSFN subframe n+1 510, and a device (such as an MTC type device 115 of FIG. 1) may follow DMRS demodulation (e.g., TM 9) for both subframes. In this example, subframe n 505 may transmit bundled data, and subframe n+1 510 may include a repeated transmission of the bundled data. In this example, the DMRS demodulation may utilize inserted DMRS tones 520 that are inserted in both subframes 505, 510.

Additionally, subframe n+1 510 may include inserted legacy DMRS tones 515 and may also include additional inserted DMRS tones 520, which may be inserted to utilize all available DMRS resources within a resource block used for DMRS transmissions. Thus, the number of DMRS tones transmitted during the second subframe, subframe n+1 51-, is greater than a number of DMRS tones transmitted during the first subframe, subframe n 505. For bundled transmissions in which channel estimation may be a bottleneck to data rate, such an increase in the density of DMRS tones for repeated PDSCH data may enhance bundled data transmission efficiency.

In further examples, DMRS tones may be inserted in PDSCH transmissions utilizing a subset of available DMRS resources within a resource block used for DMRS transmissions, but with a transmission power that is increased relative to a specified power for DMRS tones. For example, 12 tones within one RB may be used for DMRS transmission but with 3 dB power boost in DMRS tones (i.e., assume rank one transmission and use only the tones for one antenna port). In still further examples, additional DMRS pilot tones beyond 24 may be inserted for bundled data transmissions. The new pilots, in examples, may be inserted only within the resources assigned to the bundled transmission, and will not impact signals outside the assigned resources. While the examples of FIGS. 3-5 are described with reference to PDSCH, such techniques may also be utilized in uplink transmissions. For example, a PUSCH assignment may include 4 RB, and a 2-symbol uplink DMRS may be employed instead of 1-symbol uplink DMRS, to provide improved channel estimation for bundled transmissions. The additional DMRS pilot tones may only occupy 4 RB as well, similarly as described above, and thus such inserted pilot tones may be transparent to legacy users. Bundling techniques may be used, according to various examples, for data transmitted using one or more of PDCCH, PDSCH, PUSCH, PUCCH, or PRACH.

Figure 6:
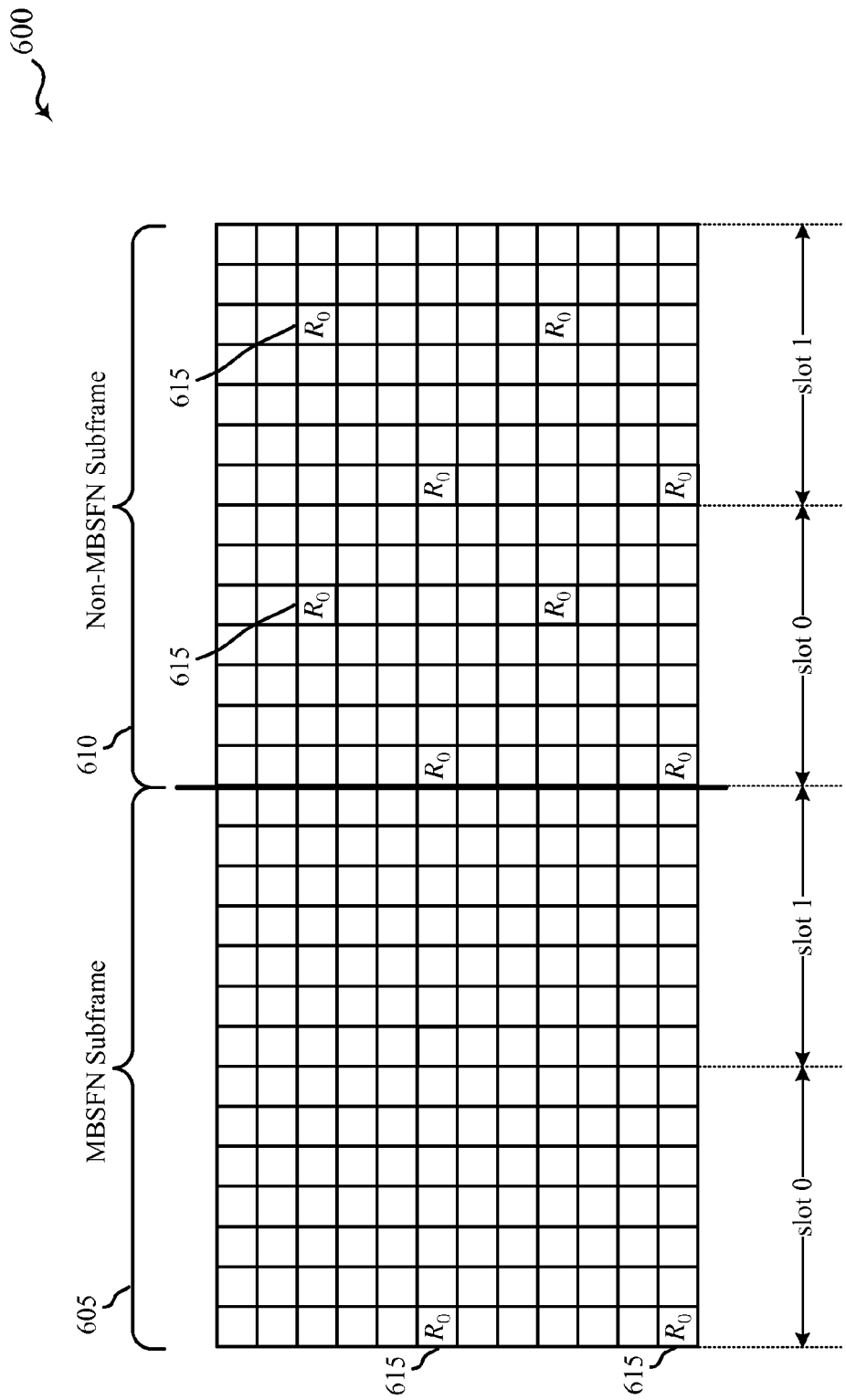
FIG. 6 is a block diagram illustrating an example of CRS resources that may be employed in accordance with various embodiments.

As noted above, in MBSFN subframes, CRS tones may be transmitted only in the first two symbols of the subframe. FIG. 6 is a diagram illustrating an example frame structure 600 of CRS tones in MBSFN and non-MBSFN subframes that may be used in a wireless communication system, including the wireless communication system 100 described above with reference to FIG. 1. For example, the frame structure 600 may be used in LTE/LTE-A or similar systems. As mentioned above, MBSFN configured subframes, according to certain examples, may include CRS tones 615 only in the first two symbols, while non-MBSFN subframes may include CRS tones 615 in other symbols. In FIG. 6, subframe n 605 may be an MBSFN subframe, and subframe n+1 610 may be a non-MBSFN subframe. In examples where bundling is used to transmit data using both MBSFN subframe n 605 and non-MBSFN subframe n+1 610, the density of CRS tones 615 is reduced in the MBSFN subframe n 605, which may have a negative impact on channel estimation. Thus, even though data may be repeated using bundling techniques, the benefits of bundling may be reduced due to poor channel estimation.

Figure 7:
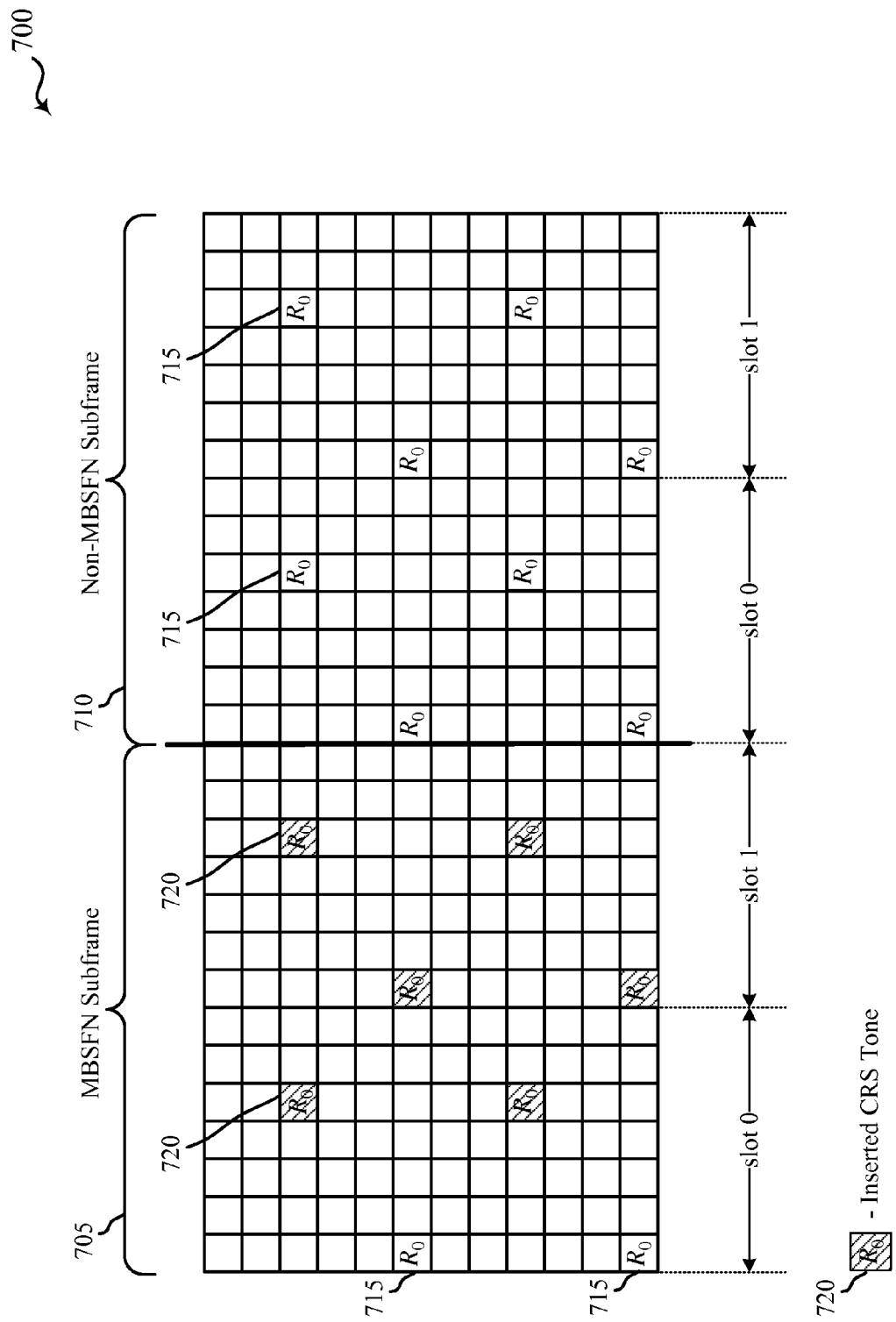
FIG. 7 is a block diagram illustrating an example of increased density of CRS resources that may be employed in accordance with various embodiments.

FIG. 7 is a diagram illustrating an example frame structure 700 with increased CRS tone density in MBSFN and non-MBSFN subframes that may be used in a wireless communication system, including the wireless communication system 100 described above with reference to FIG. 1. For example, the frame structure 700 may be used in LTE/LTE-A or similar systems. In the example, of FIG. 7, bundled transmissions may be transmitted partially on MBSFN subframe n 705 and partially on non-MBSFN subframe n+1 710, and a device (such as an MTC type device 115 of FIG. 1) may follow CRS demodulation for both types of subframes. The CRS demodulation may utilize inserted CRS tones 720 that are inserted in the MBSFN subframe 705, which may follow the same CRS antenna port configurations as the non-MBSFN subframe 710. Thus the locations of the inserted CRS tones 720 may match the locations of CRS tones 715 in non-MBSFN subframe 710.

For bundled transmissions in which channel estimation may be a bottleneck to data rate, such an increase in the density of CRS tones for bundled PDSCH data may enhance bundled data transmissions. Thus, bundling techniques may enhance channel estimation through identifying data for transmission on a wireless communications network, determining that the data is to be transmitted in a bundled transmission using two or more subframes, and increasing a density of reference signals in at least one of the two or more subframes. In some examples, the additional CRS tones 720 may be rate matched around existing legacy signals so as to not impact legacy users of the wireless communications system. In certain examples, the additional CRS tones may be inserted within one or more resource blocks used to transmit the bundled transmission.

In still further examples, additional CRS pilot tones beyond the legacy number of CRS tones may be inserted for bundled data transmissions. The new pilots, in examples, may be inserted only within the resources assigned to the bundled transmission, and thus will not impact signals outside the assigned resources. For example, a PDSCH assignment may include 8 RB, and the transmission mode may be a CRS based demodulation mode. In such a case, one or more new CRS tones may be inserted within the 8 RB assignment.

As mentioned above, data transmitted using PBCH may also be transmitted using bundling techniques to provide repeated transmissions of the data. Also, as mentioned above, a device (such as an MTC device 115 of FIG. 1) may not know the MBSFN configuration of a base station prior to decoding information transmitted in the PBCH. Thus, in some examples, PBCH repetition may be provided using only certain subframes.

Figure 8A:
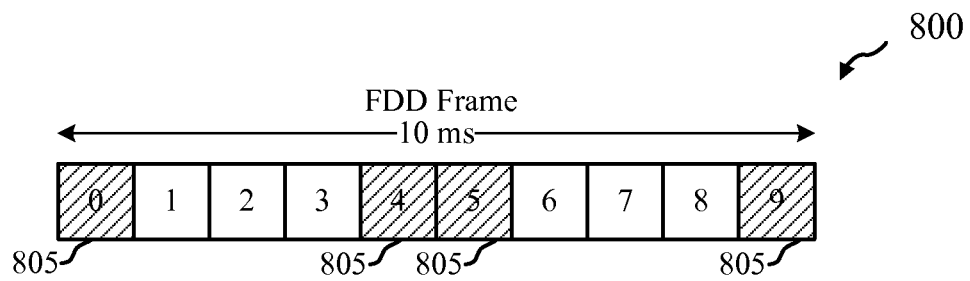
FIGS. 8A, 8B, and 8C are block diagrams illustrating examples of subframes that may be employed for PBCH bundling transmissions, in accordance with various embodiments.
Figure 8B:
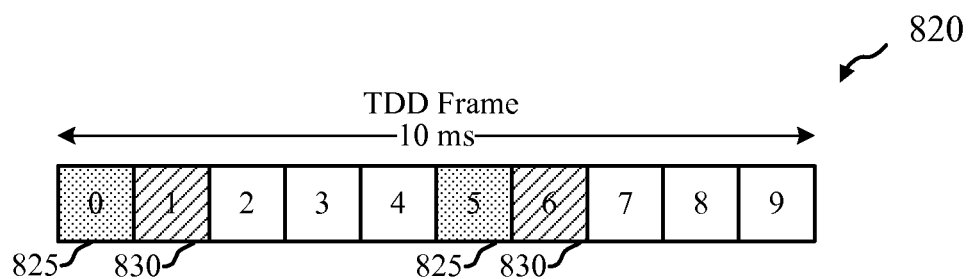
Figure 8C:
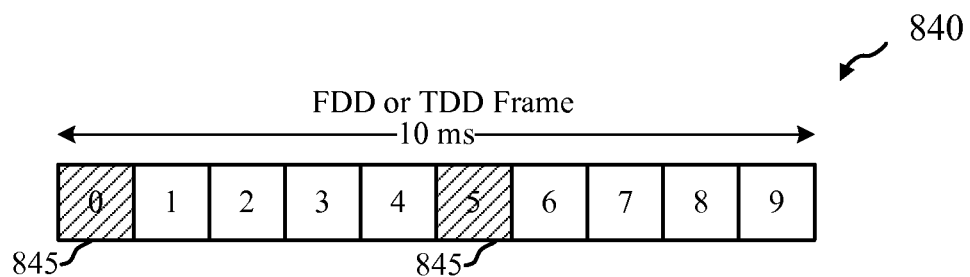

FIGS. 8A, 8B, and 8C are diagrams illustrating example frame structures 800, 820, and 840, respectively, that may support PBCH repetition in subframes that may be used in a wireless communication system, including the wireless communication system 100 described above with reference to FIG. 1. For example, the frame structures 800, 820, and 840 may be used in LTE/LTE-A or similar systems. In systems that operate according to FDD, subframes 0, 4, 5, and 9 may not be configurable as MBSFN subframes. Accordingly, an FDD frame 800 of FIG. 8A may include PBCH repetition subframes 805 corresponding to non-MBSFN-configurable subframes 0, 4, 5, and 9.

Similarly, a TDD frame 820 of FIG. 8B may include PBCH repetition subframes 825 and 830 corresponding to non-MBSFN-configurable subframes 0, 1, 5, and 6. In other examples, TDD frame 820 may include PBCH repetition only on subframes 825 corresponding to non-MBSFN-configurable subframes 0 and 5, because subframes 1 and 6 may be special subframes, and a device may not have knowledge of the special subframe configuration prior to decoding information from the PBCH. In still further examples, FDD or TDD frame 840 of FIG. 8C may include PBCH repetition subframes 845 corresponding to non-MBSFN-configurable subframes 0 and 5. In such examples, PBCH repetition subframes 845 have a commonality between both FDD and TDD. As such, subframes 0 and 5 may be used for PBCH repetition irrespective of whether the wireless communications system is operating according to a TDD protocol or a FDD protocol.

According to other examples, PBCH repetitions may be transmitted using MBSFN subframes, and a PBCH repetition pattern may be the same across both MBSFN and non-MBSFN subframes. In still other examples, the PBCH repetition pattern may be the same across all non-MBSFN-configurable subframes (e.g. 0/4/5/9 for FDD, 0/1/5/6 for TDD), and may be the same across all MBSFN-configurable subframes, but across these two types of subframes the repetition pattern may be different. In certain examples, PBCH repetition may be supported differently on FDD and TDD configurations. For example, bundled PBCH transmissions may be repeated on subframes 0, 4, 5, and 9 of FDD, but repeated on subframes 0 and 5 for TDD. In other examples, bundled PBCH may be repeated only on non-MBSFN-configurable subframes for FDD, but can be repeated on MBSFN-configurable subframes for TDD. According to further examples, PBCH repetition for bundled PBCH transmissions may be subframe dependent. For example, when PBCH is repeated in subframe 0, the repeated PBCH include CRS tones that rate match around the CRS ports by assuming there are 4 CRS antenna ports. In some examples, additional CRS pilot tones may also be added.

Figure 9:
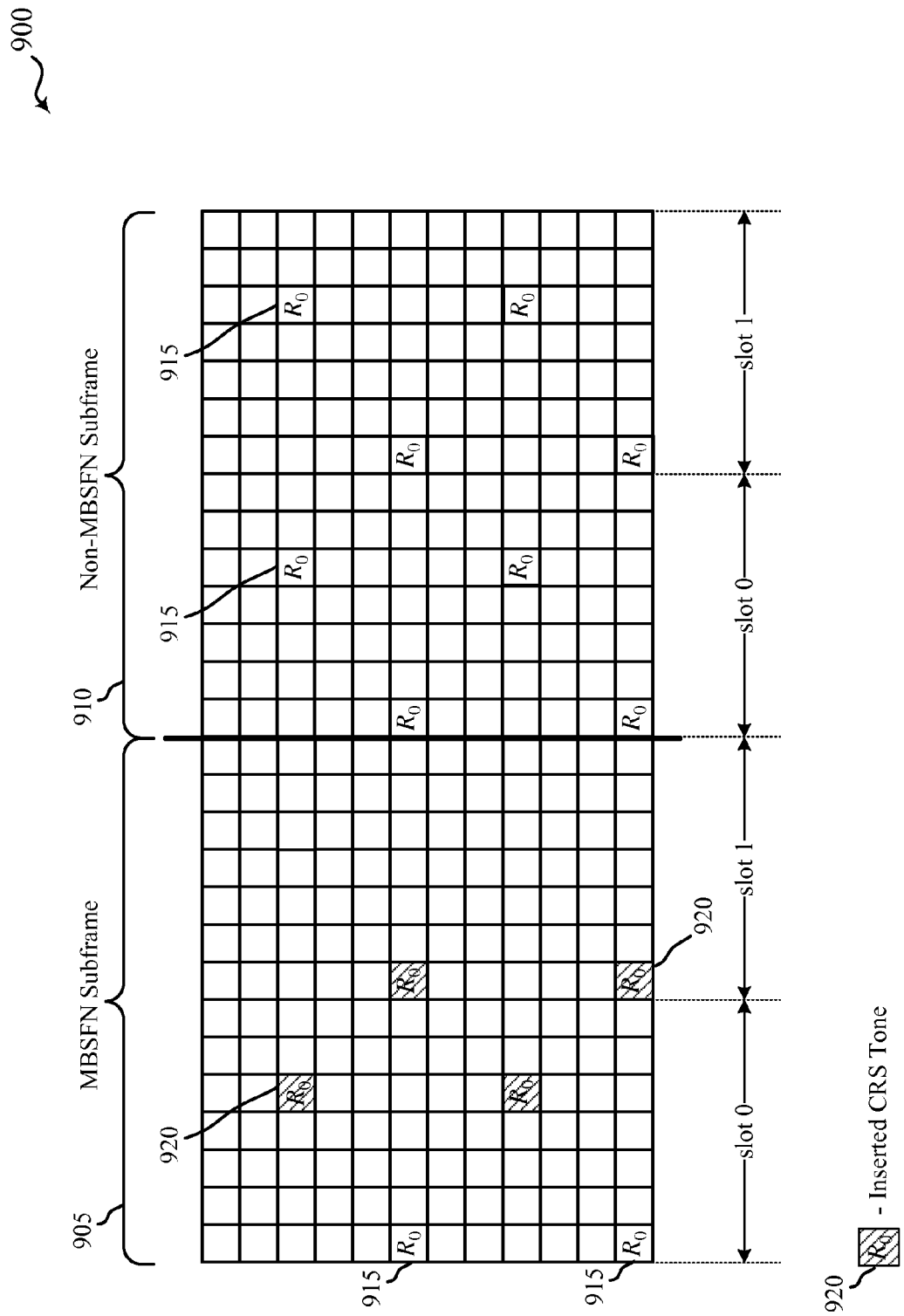
FIG. 9 is a block diagram illustrating an example of increased density of CRS resources that may be employed in PBCH bundling transmissions, in accordance with various embodiments.

In cases where PBCH is repeated within a subframe where MBSFN is configured, CRS tones may transmitted only in the first two symbols according to legacy CRS configuration. In some examples, repeated PBCH data tones may be transmitted with inserted CRS tones, that are inserted back into the legacy CRS tone position the same way as non-MBSFN subframes. FIG. 9 is a diagram illustrating an example frame structure 900 with increased CRS tone density in MBSFN subframes that may be used in a wireless communication system, including the wireless communication system 100 described above with reference to FIG. 1. For example, the frame structure 900 may be used in LTE/LTE-A or similar systems. In the example, of FIG. 9, bundled transmissions may be transmitted partially on MBSFN subframe 905 and partially on non-MBSFN subframe 910. CRS demodulation may utilize inserted CRS tones 920 that are inserted in the MBSFN subframe 905, which may follow the same CRS antenna port configurations as the non-MBSFN subframe 910. Thus the locations of the inserted CRS tones 920 may match locations of CRS tones 915 in non-MBSFN subframe 910. However, PBCH may be constrained to be transmitted only in the center six resource blocks of a subframe, and in such cases the inserted CRS tones 920 may be included only in the center six resource blocks of the MBSFN subframe 905. The inserted CRS tones 920, according to some examples, may be inserted at locations corresponding to legacy CRS locations with four antenna ports, regardless of the actual antenna ports.

In other examples, repeated PBCH data tones may be transmitted with inserted DMRS tones. Thus, in such examples, DMRS pilot tones may be inserted and used for PBCH-based demodulation of the PBCH transmissions. In such examples, the DMRS ports used to establish locations of the DMRS tones may be fixed at predetermined locations associated with the bundled PBCH transmissions, or the DMRS ports may be the same as the number of antenna ports used to transmit the PBCH. In still further examples, PBCH data tones may be transmitted using all available tones, although the reduced density of reference signal tones may have a negative impact on channel estimation.

Additionally, in some examples, bundled PBCH data may be repeated within a subframe. In such examples, additional reference signal tones may be inserted in the repeated transmission(s). For example, PBCH repetition may be provided in the last two symbols of the 2nd slot within a subframe. Without the additional reference signals, there are 264 resource elements (REs) for repeated transmissions. With additional reference signal tones, in some examples either 12 or 24 new inserted CRS Res may be provided, which provides 252 or 240 data REs for PBCH transmissions.

Figure 10A:
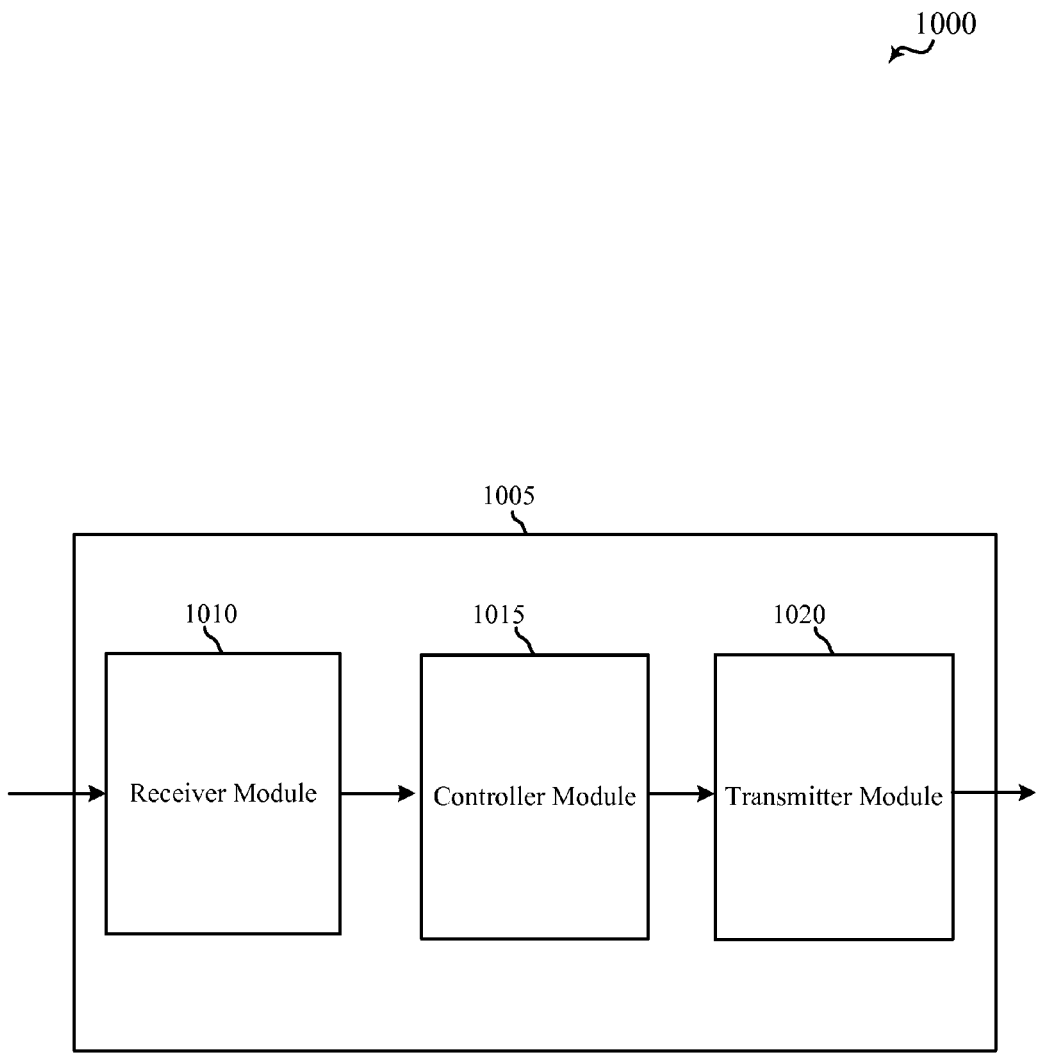
FIGS. 10A and 10B are block diagrams of a device(s) configured for transmission bundling techniques, in accordance with various embodiments.
Figure 10B:
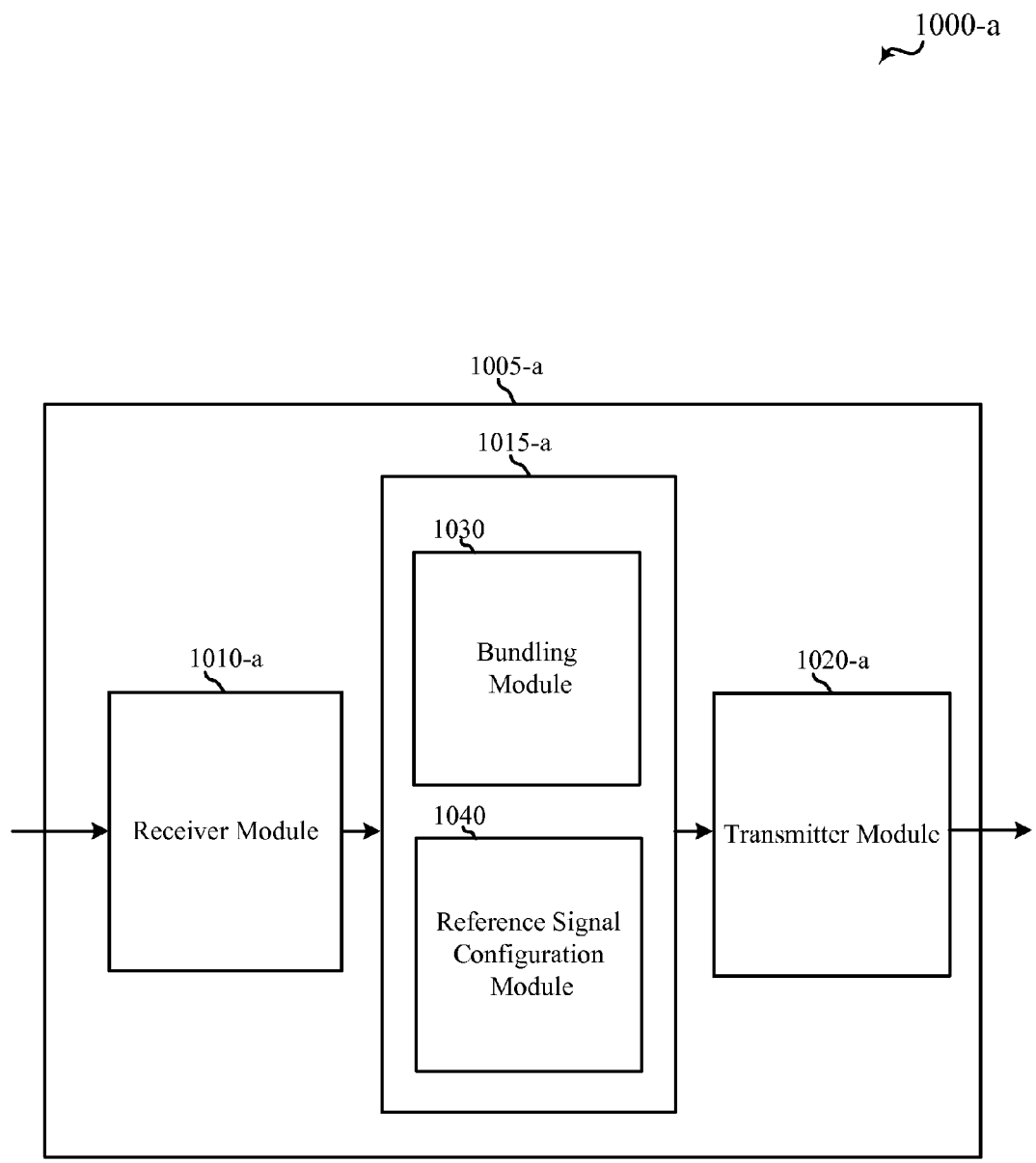

Next, FIGS. 10A and 10B depict block diagrams 1000 of a device(s) 1005 configured for bundling techniques, in accordance with various embodiments. In various embodiments, the device 1005 is an example of various aspects of the base stations 105 and UEs 115 described with reference to the preceding Figures. The device 1005 may include a receiver module 1010, a controller module 1015, and/or a transmitter module 1020, which may each be in communication with one another. The various modules of the device 1005 may be means for performing the functions described herein. In some embodiments, one or more aspects of the device 1005 is a processor.

The receiver module 1010 may be configured to receive a bundled transmission having an increased density of reference signal tones. The transmitter module 1020 may be configured to transmit a bundled transmission having an increased density of reference signal tones. In other examples, the transmitter module 1020 may be configured to refrain from transmitting bundled data on a subframe having a particular reference signal density or a subframe scheduled for a MBMS transmission. The controller module 1015 may be capable of, and arranged to configure the various transmissions and receptions, which may include increased density of reference signal tones, or determining that data is to be transmitted in a bundled transmission using subframes having a certain reference signal density, such as described with respect to FIGS. 1-9.

FIG. 10B shows a block diagram 1000-*a* of a device 1005-*a* configured bundled transmission techniques, in accordance with various embodiments. The device 1005-*a* may be an example of the device 1005 of FIG. 10A, and it may be configured to perform the same or similar functions. The device 1005-*a* may include a receiver module 1010-*a*, a controller module 1015-*a*, and/or a transmitter module 1020-*a*, which may each be in communication with one another, and which may be examples of the corresponding modules of FIG. 10A. In some embodiments, one or more aspects of the device 1005-*a* is a processor.

The controller module 1015-*a* may include a bundling module 1030 and/or a reference signal configuration module 1040. The bundling module 1030 may be configured to identify data for transmission on a wireless communications network and determining that the data is to be transmitted in a bundled transmission. Additionally or alternatively, the bundling module 1030 may be configured to determine that data is to be transmitted in a bundled transmission using two or more subframes having a first reference signal density. Additionally or alternatively, the bundling module 1030 may be configured to determine whether a MBMS transmission is scheduled for one of the subframes of the bundled transmission. The bundling module 1030 may, in conjunction with the transmitter module 1020-*a*, transmit first signaling indicative of MBMS scheduling to a first set of UEs scheduled to receive the bundled transmission, and transmit second signaling indicative of MBMS scheduling to a second set of UEs scheduled to receive the MBMS transmission.

The reference signal configuration module 1040 may be configured to increase a density of reference signals in at least a portion of the bundled transmission. For example, the reference signal configuration module 1040 may increase a density of reference signals transmitted during a MBSFN subframe or during a subframe scheduled for a MBMS transmission, such as described above with respect to FIGS. 1-9. Or, in some examples, the reference signal configuration module 1040 may, in conjunction with the transmitter module 1020-*a*, refrain from transmitting bundled data on a subframe having a second reference signal density or a subframe scheduled for a MBMS transmission. This may include puncturing data bundled on consecutive subframes having a first reference signal density with a subframe having a second reference signal density. Or, it may include rate matching bundled transmission in subframes having the first reference signal density around subframes having the second reference signal density. It may include increasing a density of reference signals in a subframe scheduled for a MBMS transmission.

Figure 11:
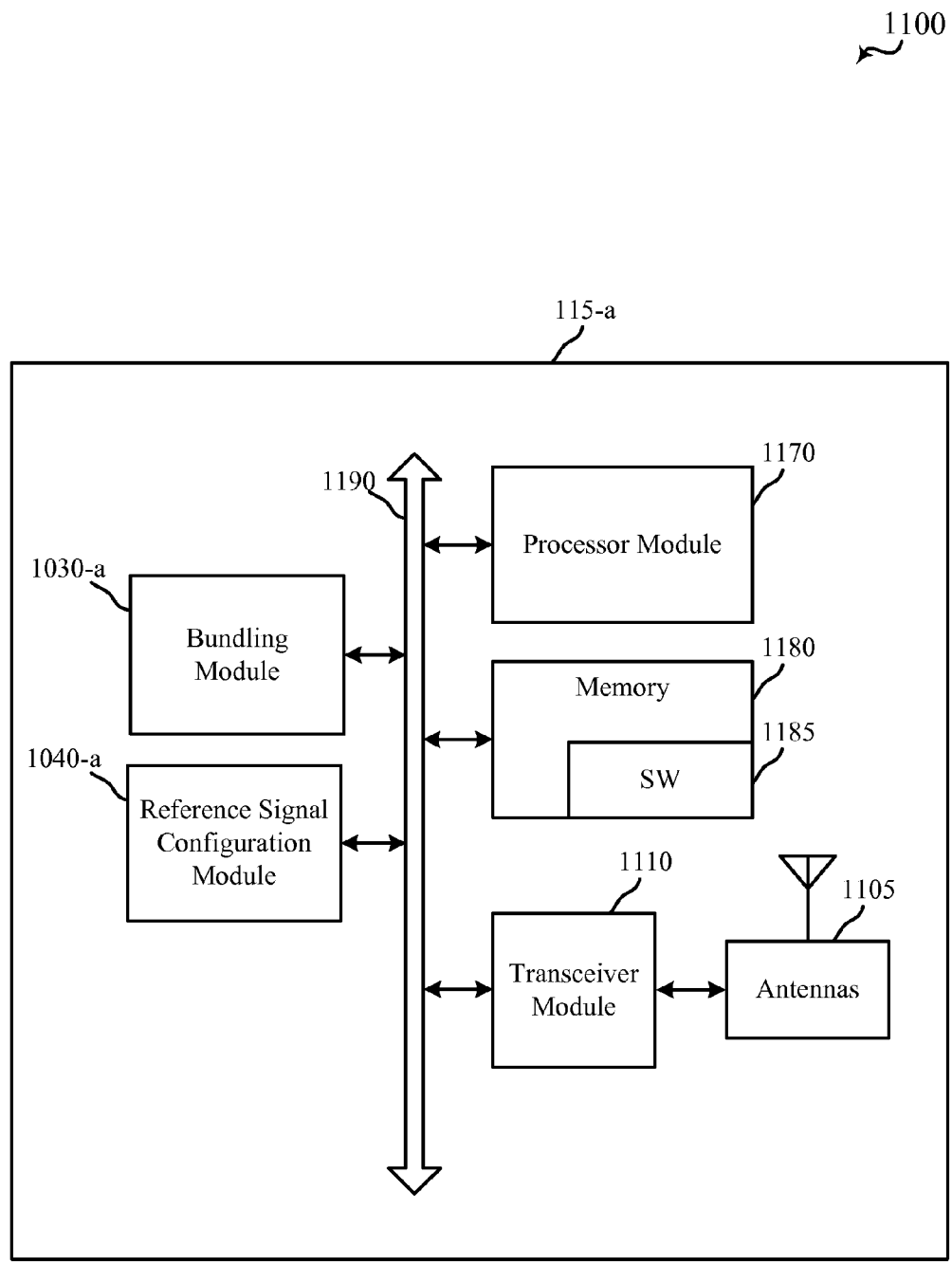
FIG. 11 is a block diagram of UE configured for transmission bundling techniques, in accordance with various embodiments.

Turning next to FIG. 11, shown is a block diagram 1100 of UE 115-*a* configured for effective deployment of bundling techniques, in accordance with various embodiments. The UE 115-*a* may be an MTC device and/or a reception-limited UE, for example. In other examples, the UE 115-*a* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-*a* may have an internal power supply (not shown), such as a small battery, to facilitate mobile operation. In some embodiments, the UE 115-*a* may be an example of the UEs 115 of FIG. 1.

The UE 115-*a* may generally include components for bi-directional voice and/or data communications including components for transmitting communications and components for receiving communications. The UE 115-*a* may include antenna(s) 1105, a transceiver module 1110, a processor module 1170, and memory 1180 (including software (SW) 1185), which each may communicate, directly or indirectly, with each other (e.g., via one or more buses 1190). The transceiver module 1110 may be configured to communicate bi-directionally, via the antenna(s) 1145 and/or one or more wired or wireless links, with one or more networks, as described above. For example, the transceiver module 1110 may be configured to communicate bi-directionally with base stations 105 of FIG. 1. The transceiver module 1110 may include a modem configured to modulate the packets and provide the modulated packets to the antenna(s) 1105 for transmission, and to demodulate packets received from the antenna(s) 1105. While the UE 115-*a* may include a single antenna 1105, the UE 115-*a* may have multiple antennas 1105 capable of concurrently transmitting and/or receiving multiple wireless transmissions.

The memory 1180 may include random access memory (RAM) and read-only memory (ROM). The memory 1180 may store computer-readable, computer-executable software/firmware code 1185 containing instructions that are configured to, when executed, cause the processor module 1170 to perform various functions described herein (e.g., identifying reception timing, prioritizing channels, prioritizing CCs, partitioning buffers, etc.). Alternatively, the software/firmware code 1185 may not be directly executable by the processor module 1170 but may be configured to cause a computer (e.g., when compiled and executed) to perform functions described herein.

The processor module 1170 may include an intelligent hardware device, e.g., a central processing unit (CPU), a microcontroller, an application-specific integrated circuit (ASIC), etc. According to the architecture of FIG. 11, the UE 115-*a* may further include a bundling module 1030-*a* and/or a reference signal configuration module 1040-*a*, which may be substantially the same as the determination modules 1030 and the configuration modules 1040 of FIG. 10B. By way of example, the bundling module 1030-*a* and/or the reference signal configuration module 1040-*a* may be components of the UE 115-*a* in communication with some or all of the other components of the UE 115-*a* via the bus 1190. Alternatively, functionality of these modules may be implemented as a component of the transceiver module 1110, as a computer program product, and/or as one or more controller elements of the processor module 1170.

Figure 12:
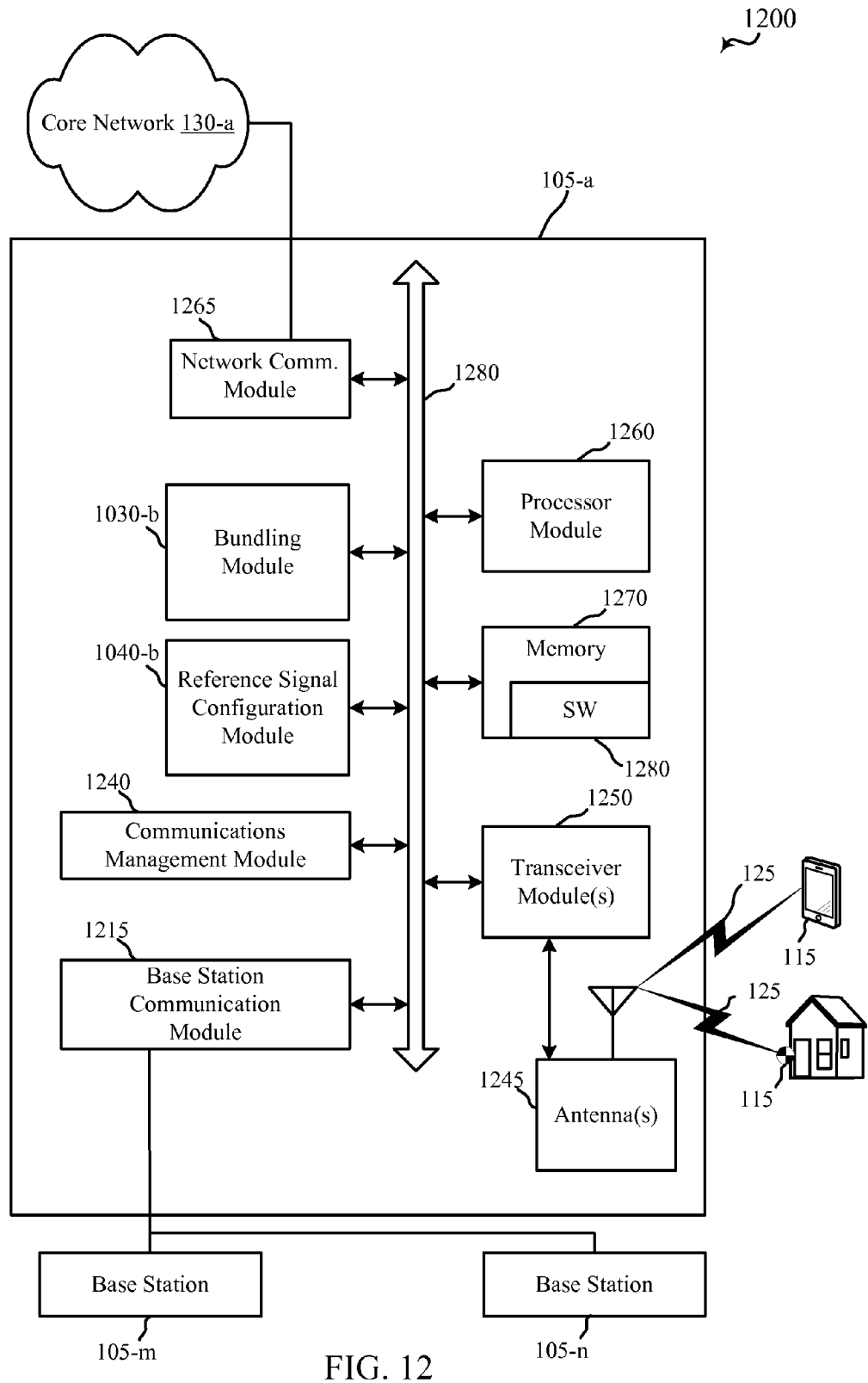
FIG. 12 is a block diagram of an example system configured for transmission bundling techniques, in accordance with various embodiments.

Next, FIG. 12 shows a block diagram of an example system 1200 configured for effective deployment of transmission bundling techniques, in accordance with various embodiments. This system 1200 may be an example of aspects of the system 100 depicted in FIG. 1. The system 1200 includes an eNB 105-*a* configured for communication with UEs 115 over wireless communication links 125. The eNB 105-*a* may be capable of receiving communication links 125 from other base stations (not shown). The eNB 105-*a* may be, for example, an eNB 105 as illustrated in FIG. 1.

In some cases, the eNB 105-*a* may have one or more wired backhaul links. The eNB 105-*a* may be a macro eNB 105 having a wired backhaul link (e.g., S1 interface, etc.) to the core network 130-*a*. The eNB 105-*a* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, eNB 105-*a* may communicate with other base stations such as 105-*m* and/or 105-*n* utilizing base station communication module 1215. In some embodiments, base station communication module 1215 may provide an X2 interface within an LTE/LTE-A wireless communication network technology to provide communication between some of the base stations 105. In some embodiments, eNB 105-*a* may communicate with other base stations through core network 130-*a*. In some cases, the eNB 105-*a* may communicate with the core network 130-*a* through network communications module 1265. The components for the eNB 105-*a* may be configured to implement aspects discussed above with respect to base stations 105 of FIG. 1, and/or devices 1005 of FIGS. 10A and 10B. For example, the eNB 105-*a* may be configured to receive bundled transmissions and/or to send bundled transmissions such as described above.

The base station 105-*a* may include antennas 1245, transceiver modules 1250, a processor module 1260, and memory 1270 (including software (SW) 1275), and which each may be in communication, directly or indirectly, with each other (e.g., over bus system 1280). The transceiver modules 1250 may be configured to communicate bi-directionally, via the antennas 1245, with the UEs 115, which may be UEs of different categories. The transceiver module 1250 (and/or other components of the eNB 105-*a*) may also be configured to communicate bi-directionally, via the antennas 1245, with one or more other base stations (not shown). The transceiver module 1250 may include a modem configured to modulate the packets and provide the modulated packets to the antennas 1245 for transmission, and to demodulate packets received from the antennas 1245. The base station 105-*a* may include multiple transceiver modules 1250, each with one or more associated antennas 1245.

The memory 1270 may include random access memory (RAM) and read-only memory (ROM). The memory 1270 may also store computer-readable, computer-executable software code 1275 containing instructions that are configured to, when executed, cause the processor module 1260 to perform various functions described herein (e.g., bundling determination, reference signal insertion, demodulation according to received reference signals, etc.). Alternatively, the software 1275 may not be directly executable by the processor module 1260 but be configured to cause the computer, e.g., when compiled and executed, to perform functions described herein.

The processor module 1260 may include an intelligent hardware device, e.g., a central processing unit (CPU), a microcontroller, an application-specific integrated circuit (ASIC), etc. The processor module 1260 may include various special purpose processors such as encoders, queue processing modules, base band processors, radio head controllers, digital signal processors (DSPs), and the like.

According to the architecture of FIG. 12, the eNB 105-*a* may further include a communications management module 1240. The communications management module 1240 may manage communications with other base stations 105. The communications management module may include a controller and/or scheduler for controlling communications with UEs 115 in cooperation with other base stations 105. For example, the communications management module 1240 may perform scheduling for reference signal transmissions to UEs 115.

Additionally or alternatively, the eNB 105-*a* may include a bundling module 1030-*b*, which may be configured substantially the same as the module 1030 described with reference of FIG. 10B. The reference signal configuration module 1040-*b* may be configured substantially the same as the module 1040 described with reference of FIG. 10B. In some embodiments, the bundling module 1030-*b* and/or the reference signal configuration module 1040-*b* are components of the eNB 105-*d* in communication with some or all of the other components of the eNB 105-*a* via the bus 1070. Alternatively, functionality of the bundling module 1030-*b* and/or the reference signal configuration module 1040-*b* may be implemented as a component of the transceiver module 1250, as a computer program product, as one or more controller elements of the processor module 1260, and/or as an element of the communications management module 1240.

Figure 13:
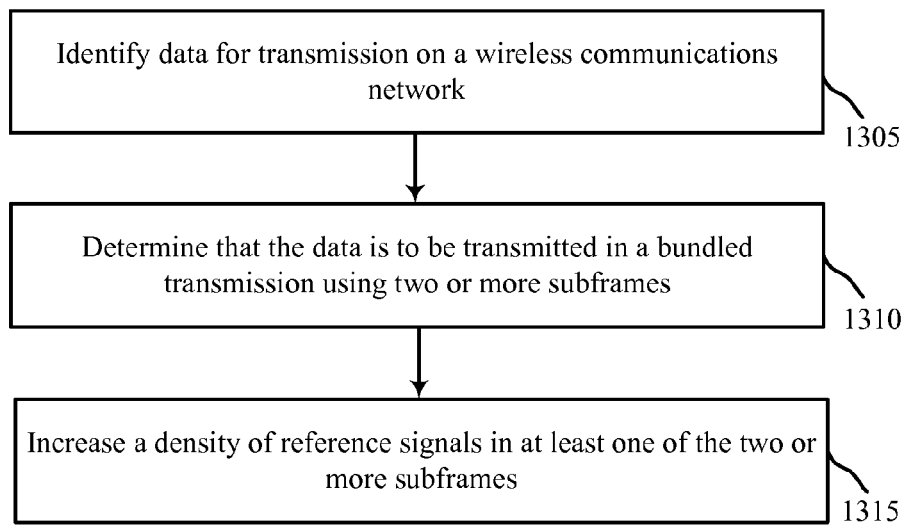
FIG. 13 is a flowchart of a method for transmission bundling techniques, according to various embodiments.

In FIG. 13, a flowchart of a method 1300 for transmission bundling techniques, according to various embodiments, is shown. The method 1300 may be implemented by one or more of the UEs 115 or base stations 105 of the preceding figures. Additionally or alternatively, the operations of the method 1300 may be performed by the receiver modules 1010, the controller modules 1015, and/or the transmitter modules 1020 described with reference to FIGS. 10A and 10B.

At block 1305, the method may include identifying data for transmission on a wireless communications network. At block 1310, the method may determine that the data is to be transmitted in a bundled transmission using two or more subframes. At block 1315, the method may include increasing a density of reference signals in at least one of the two or more subframes.

Figure 14:
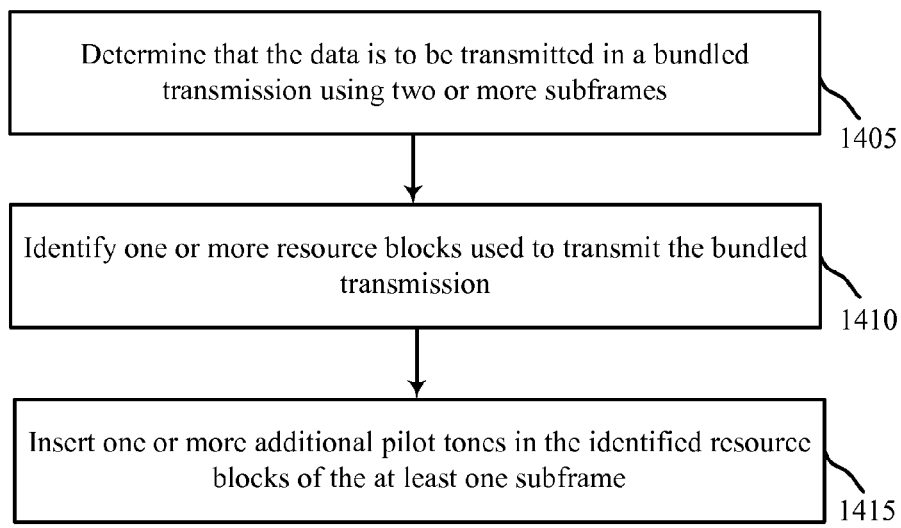
FIG. 14 is a flowchart of another method for transmission bundling techniques, according to various embodiments.

In FIG. 14, a flowchart of a method 1400 for transmission bundling techniques, according to various embodiments, is shown. The method 1400 may be implemented by one or more of the UEs 115 or base stations 105 of the preceding figures. Additionally or alternatively, the operations of the method 1400 may be performed by the receiver modules 1010, the controller modules 1015, and/or the transmitter modules 1020 described with reference to FIGS. 10A and 10B.

At block 1405, the method may include determining that the data is to be transmitted in a bundled transmission using two or more subframes. At block 1410, the method may identify one or more resource blocks used to transmit the bundled transmission. At block 1415, the method may insert one or more additional pilot tones in the identified resource blocks of the at least one subframe.

Figure 15:
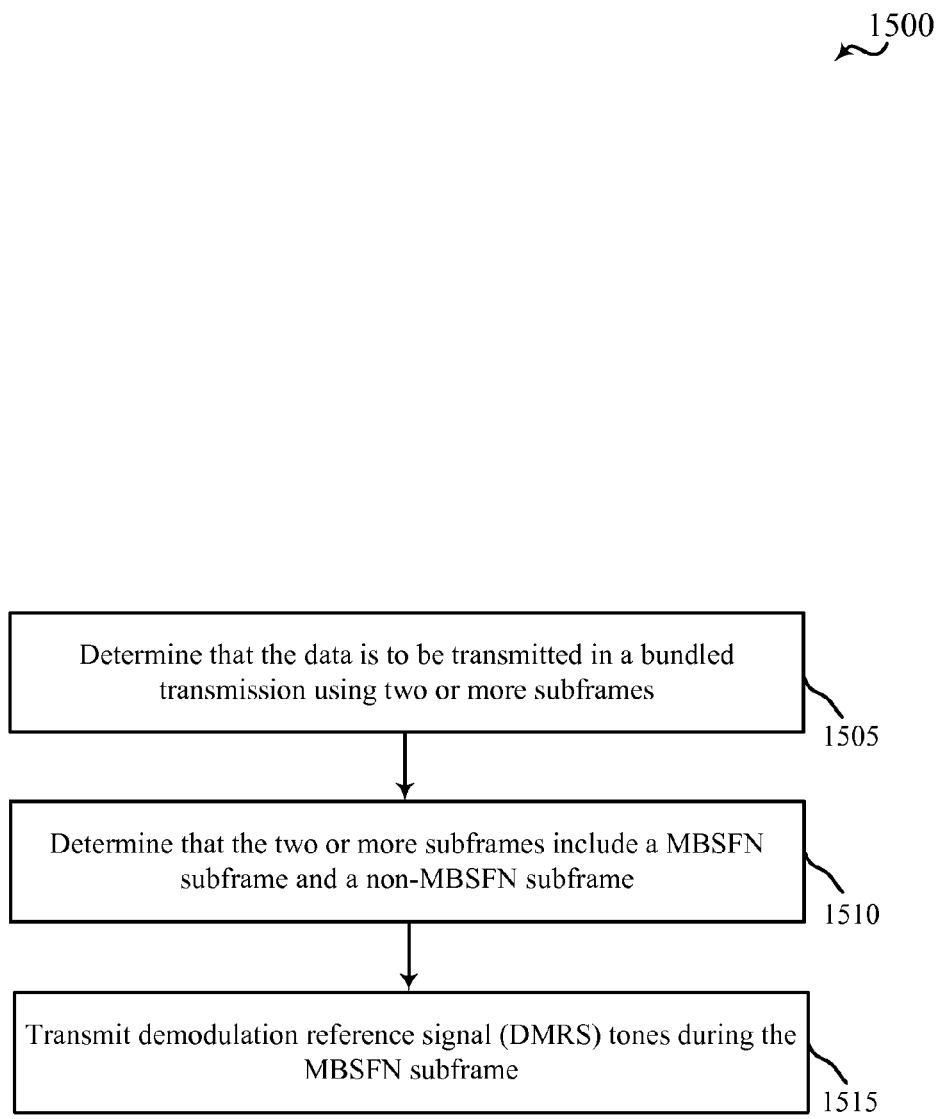
FIG. 15 is a flowchart of another method for transmission bundling techniques, according to various embodiments.

In FIG. 15, a flowchart of a method 1500 for transmission bundling techniques, according to various embodiments, is shown. The method 1500 may be implemented by one or more of the UEs 115 or base stations 105 of the preceding figures. Additionally or alternatively, the operations of the method 1500 may be performed by the receiver modules 1010, the controller modules 1015, and/or the transmitter modules 1020 described with reference to FIGS. 10A and 10B.

At block 1505, the method may include determining that the data is to be transmitted in a bundled transmission using two or more subframes. At block 1510, the method may determine that the two or more subframes include a MBSFN subframe and a non-MBSFN subframe. At block 1515, the method may transmit demodulation reference signal (DMRS) tones during the MBSFN subframe.

Figure 16:
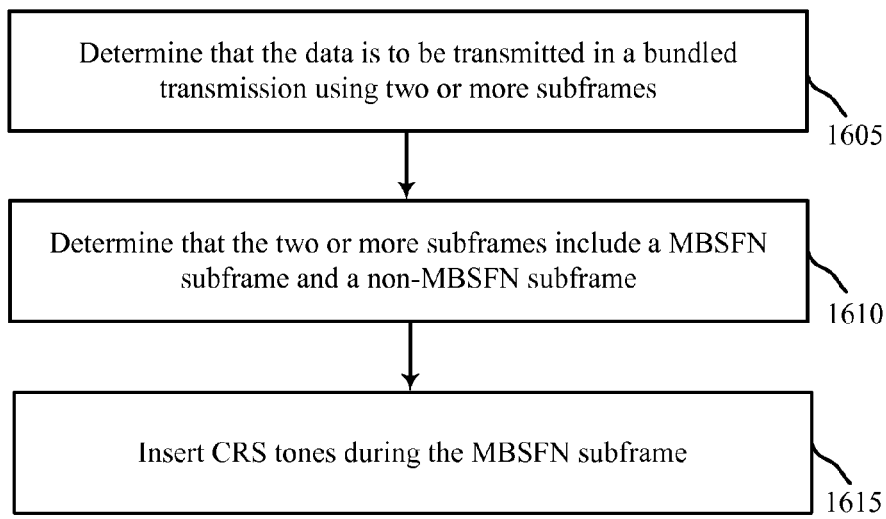
FIG. 16 is a flowchart of another method for transmission bundling techniques, according to various embodiments.

In FIG. 16, a flowchart of a method 1600 for transmission bundling techniques, according to various embodiments, is shown. The method 1600 may be implemented by one or more of the UEs 115 or base stations 105 of the preceding figures. Additionally or alternatively, the operations of the method 1600 may be performed by the receiver modules 1010, the controller modules 1015, and/or the transmitter modules 1020 described with reference to FIGS. 10A and 10B.

At block 1605, the method may include determining that the data is to be transmitted in a bundled transmission using two or more subframes. At block 1610, the method may determine that the two or more subframes include a MBSFN subframe and a non-MBSFN subframe. At block 1615, the method may insert CRS tones during the MBSFN subframe.

Figure 17:
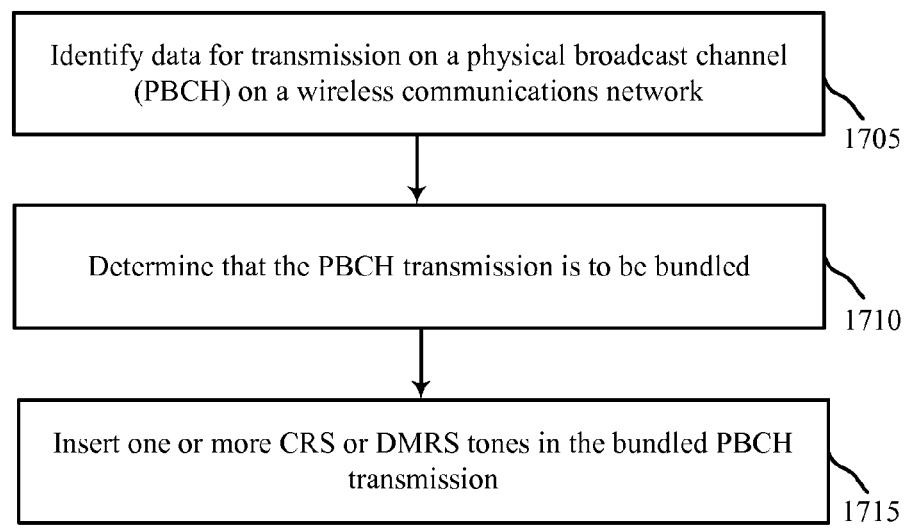
FIG. 17 is a flowchart of another method for transmission bundling techniques, according to various embodiments.

In FIG. 17, a flowchart of a method 1700 for transmission bundling techniques, according to various embodiments, is shown. The method 1700 may be implemented by one or more of the UEs 115 or base stations 105 of the preceding figures. Additionally or alternatively, the operations of the method 1700 may be performed by the receiver modules 1010, the controller modules 1015, and/or the transmitter modules 1020 described with reference to FIGS. 10A and 10B.

At block 1705, the method may include identifying data for transmission on a physical broadcast channel (PBCH) on a wireless communications network. At block 1710, the method may determine that the PBCH transmission is to be bundled. At block 1715, the method may insert one or more CRS or DMRS tones in the bundled PBCH transmission.

Figure 18:
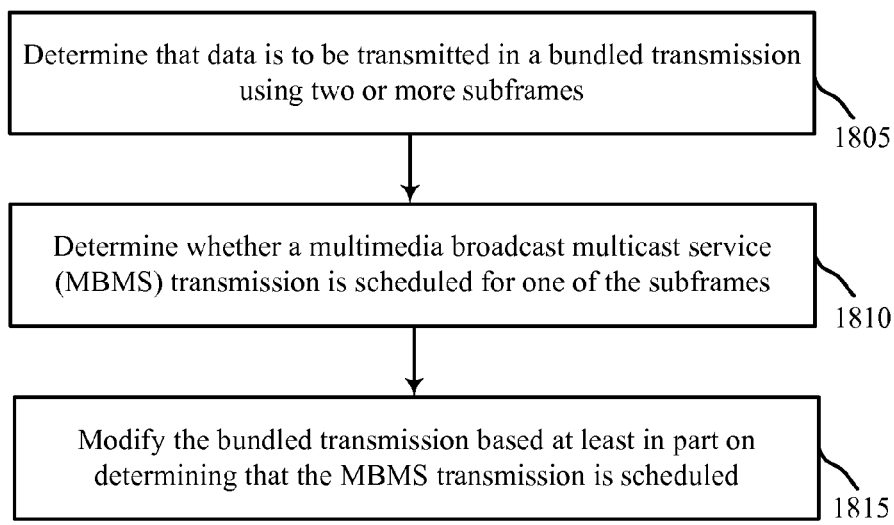
FIG. 18 is a flowchart of another method for transmission bundling techniques, according to various embodiments.

In FIG. 18, a flowchart of a method 1800 for transmission bundling techniques, according to various embodiments, is shown. The method 1800 may be implemented by one or more of the UEs 115 or base stations 105 of the preceding figures. Additionally or alternatively, the operations of the method 1800 may be performed by the receiver modules 1010, the controller modules 1015, and/or the transmitter modules 1020 described with reference to FIGS. 10A and 10B.

At block 1805, the method may include determining that data is to be transmitted in a bundled transmission using two or more subframes. At block 1810, the method may include determining whether a MBMS transmission is scheduled for one of the subframes. At block 1815, the method may include modifying the bundled transmission based at least in part on determining that the MBMS transmission is scheduled.

Modifying the bundled transmission may include refraining from transmitting the data on the subframe scheduled for the MBMS transmission. In some examples, modifying the bundled transmission may include increasing a density of reference signals in the subframe scheduled for the MBMS transmission.

The method 1800 may further include transmitting first signaling indicative of MBMS scheduling to a first set of UEs scheduled to receive the bundled transmission, and transmitting second signaling indicative of MBMS scheduling to a second set of UEs scheduled to receive the MBMS transmission. The bundled transmission may include a bundled unicast transmission. In some cases, the bundled transmission may include a bundled broadcast transmission.

Those skilled in the art will recognize that the methods 1300, 1400, 1500, 1600, 1700, and 1800 are example implementations of the tools and techniques described herein. The methods may be performed with more or fewer steps; and they may be performed in an order other than indicated The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
identifying data for repeated transmission on a wireless communications network;
determining that the data is to be transmitted in a bundled transmission that comprises two or more consecutive subframes, wherein the two or more consecutive subframes comprise the data in the bundled transmission;
increasing a density of reference signals, based on the determining, in at least one of the two or more consecutive subframes; and
transmitting the bundled transmission that comprises the two or more consecutive subframes.

2. The method of claim 1, wherein increasing the density of reference signals comprises:
inserting one or more additional pilot tones in the at least one of the two or more consecutive subframes.

3. The method of claim 2, wherein the one or more additional pilot tones are rate matched around existing legacy signals.

4. The method of claim 2, wherein the one or more additional pilot tones are inserted within one or more resource blocks used to transmit the bundled transmission.

5. The method of claim 1, wherein the two or more consecutive subframes comprise at least one multimedia broadcast multicast service single frequency network (MBSFN) subframe and at least one non-MBSFN subframe.

6. The method of claim 5, wherein increasing the density of reference signals comprises:
transmitting a plurality of demodulation reference signal (DMRS) or common reference signal (CRS) tones during the MBSFN subframe.

7. The method of claim 1, wherein increasing the density of reference signals comprises
inserting DMRS tones utilizing all available DMRS resources within a resource block used for DMRS transmissions.

8. The method of claim 1, wherein increasing the density of reference signals comprises:
inserting DMRS tones utilizing a subset of available DMRS resources within a resource block used for DMRS transmissions, and wherein the DMRS tones are transmitted at an increased power relative to a specified power for DMRS tones.

9. The method of claim 1, wherein increasing the density of reference signals comprises:
inserting additional DMRS tones within a resource block used for DMRS transmissions.

10. The method of claim 1, wherein increasing the density of reference signals comprises:
inserting a plurality of demodulation reference signal (DMRS) or common reference signal (CRS) tones, and wherein the number of DMRS or CRS tones transmitted during a second subframe of the two or more consecutive subframes is greater than a number of DMRS or CRS tones transmitted during a first subframe of the two or more consecutive subframes.

11. The method of claim 1, wherein a physical downlink shared channel (PDSCH) or a physical broadcast channel (PBCH) is used for the transmission.

12. The method of claim 11, wherein the PBCH is used for the transmission, and wherein the PBCH transmissions are transmitted using predetermined subframes.

13. The method of claim 12, wherein the PBCH transmissions have different predetermined patterns determined based on the wireless communications system operating according to a time division duplex (TDD) protocol or a frequency division duplex (FDD) protocol.

14. The method of claim 12, wherein the predetermined subframes have a common predetermined pattern irrespective of whether the wireless communications system is operating according to a time division duplex (TDD) protocol or a frequency division duplex (FDD) protocol.

15. The method of claim 11, wherein the PBCH transmissions are transmitted using at least one broadcast subframe and at least one non-broadcast subframe.

16. The method of claim 15, wherein a pattern of bundled PBCH transmissions using the at least one broadcast subframe is different than a pattern of bundled PBCH transmissions using the at least one non-broadcast subframe.

17. A method of wireless communication, comprising:
   determining that data is to be transmitted in repeated transmission of bundled data that comprises two or more consecutive subframes;
   determining whether a multimedia broadcast multicast service (MBMS) transmission is scheduled for one of the consecutive subframes;
   modifying the repeated transmission of bundled data that comprises two or more consecutive subframes based at least in part on determining that the MBMS transmission is scheduled; and
   transmitting the repeated transmission of bundled data that comprises two or more consecutive subframes.

18. The method of claim 17, wherein modifying the repeated transmission comprises:
   refraining from transmitting the data on the subframe scheduled for the MBMS transmission.

19. The method of claim 17, wherein modifying the repeated transmission comprises:
   increasing a density of reference signals in the subframe scheduled for the MBMS transmission.

20. The method of claim 17, further comprising:
   transmitting first signaling indicative of MBMS scheduling to a first set of user equipment (UEs) scheduled to receive the repeated transmission; and
   transmitting second signaling indicative of MBMS scheduling to a second set of UEs scheduled to receive the MBMS transmission.

21. The method of claim 17, wherein the repeated transmission comprises a bundled unicast transmission.

22. The method of claim 17, wherein the repeated transmission comprises a bundled broadcast transmission.

23. An apparatus of wireless communication, comprising:
   a processor;
   memory in electronic communication with the processor; and
   instructions stored in the memory, the instructions executable by the processor to:
   identify data for repeated transmission on a wireless communications network;
   determine that the data is to be transmitted in a bundled transmission that comprises two or more consecutive subframes, wherein the two or more consecutive subframes comprise the data in the bundled transmission;
   increase a density of reference signals, based on the determining, in at least one of the two or more consecutive subframes; and
   transmit the bundled transmission that comprises the two or more consecutive subframes.

24. The apparatus of claim 23, wherein the instructions are executable by the processor to insert one or more additional pilot tones in the at least one of the two or more consecutive subframes.

25. The apparatus of claim 23, wherein the two or more consecutive subframes comprise at least one multimedia broadcast multicast service single frequency network (MBSFN) subframe and at least one non-MBSFN subframe.

26. The apparatus of claim 23, wherein the instructions are executable by the processor to insert DMRS tones utilizing all available DMRS resources within a resource block used for DMRS transmissions.

27. The apparatus of claim 23, wherein the instructions are executable by the processor to insert a plurality of demodulation reference signal (DMRS) or common reference signal (CRS) tones, and wherein the number of DMRS or CRS tones transmitted during a second subframe of the two or more consecutive subframes is greater than a number of DMRS or CRS tones transmitted during a first subframe of the two or more consecutive subframes.

28. The apparatus of claim 23, wherein a physical downlink shared channel (PDSCH) or a physical broadcast channel (PBCH) is used for the transmission.

29. An apparatus of wireless communication, comprising:
   a processor;
   memory in electronic communication with the processor; and
   instructions stored in the memory, the instructions executable by the processor to:
   determine that data is to be transmitted in repeated transmission of bundled data that comprises two or more consecutive subframes;
   determine whether a multimedia broadcast multicast service (MBMS) transmission is scheduled for one of the consecutive subframes;
   modify the repeated transmission of bundled data that comprises two or more consecutive subframes based at least in part on determining that the MBMS transmission is scheduled; and
   transmitting the repeated transmission of bundled data that comprises two or more consecutive subframes.

30. The apparatus of claim 29, wherein the instructions are executable by the processor to:
   transmit first signaling indicative of MBMS scheduling to a first set of user equipment (UEs) scheduled to receive the repeated transmission; and
   transmit second signaling indicative of MBMS scheduling to a second set of UEs scheduled to receive the MBMS transmission.

* * * * *